US012639076B2

(12) United States Patent (10) Patent No.: US 12,639,076 B2
Sielski et al. (45) Date of Patent: May 26, 2026

(54) PROCESSOR ARCHITECTURE FOR OPTIMIZED PARALLELIZED SEARCH

(71) Applicant: NVIDIA Corporation, Santa Clara, CA (US)

(72) Inventors: Piotr Sielski, Lodz (PL); Mehmet Akif Çördük, Munich (DE)

(73) Assignee: NVIDIA Corporation, Santa Clara, CA (US)

( * ) Notice: Subject to any disclaimer, the term of this patent is extended or adjusted under 35 U.S.C. 154(b) by 107 days.

(21) Appl. No.: 18/474,728

(22) Filed: Sep. 26, 2023

(65) Prior Publication Data

US 2024/0303085 A1 Sep. 12, 2024

Related U.S. Application Data

(60) Provisional application No. 63/451,552, filed on Mar. 11, 2023.

(51) Int. Cl.
*G06F 9/38* (2018.01)
*G06N 5/01* (2023.01)

(52) U.S. Cl.
CPC ............. *G06F 9/3895* (2013.01); *G06N 5/01* (2023.01)

(58) Field of Classification Search
CPC ................................ G06F 9/3895; G06N 5/01
See application file for complete search history.

(56) References Cited

U.S. PATENT DOCUMENTS 8,321,849 B2 11/2012 Nickolls et al.
9,311,383 B1 * 4/2016 Karty ................... G06F 16/284

11,010,516 B2 5/2021 Sikka et al.
11,100,643 B2 * 8/2021 Yang ...................... G06N 3/006
2009/0319455 A1 * 12/2009 Jacobson ............... G06N 3/126
706/47

(Continued)

OTHER PUBLICATIONS

Luong, TV et al. GPU Computing for Parallel Local Search Metaheuristic Algorithms. IEEE Transactions on Computers, vol. 62, No. 1, pp. 173-185, Jan. 2013 [online], [retrieved on Mar. 4, 2025]. Retrieved from the Internet <URL: https://ieeexplore.ieee. org/abstract/document/6060799> <DOI: 10.1109/TC.2011.206>.*

(Continued)

*Primary Examiner* — Shawn Doman

(74) *Attorney, Agent, or Firm* — Foley & Lardner LLP

(57) ABSTRACT

Systems and methods in accordance with the present disclosure can implement a parallel processing system, such as a graphics processing unit (GPU)-based system, to generate solutions to complex computational problems. Aspects of this technical solution can retrieve a plurality of solutions each representing a plurality of values in a multi-dimensional space, allocate, to one or more processing units associated with the one or more circuits and having a parallelized configuration, one or more of the plurality of solutions, modify, by the one or more processing units according to the parallelized configuration, at least one value of the one or more solutions allocated to the one or more processing units, to determine a plurality of modified solutions, and output, from the plurality of modified solutions, according to one or more criteria indicating a diversity among the plurality of modified solutions, a selected solution.

20 Claims, 11 Drawing Sheets

(56) References Cited

U.S. PATENT DOCUMENTS

| | | | | |
|---|---|---|---|---|
| 2010/0138373 A1* | 6/2010 | Resende | G06F 17/11 | |
| | | | 706/46 | |
| 2011/0029468 A1* | 2/2011 | Fox | G16B 35/20 | |
| | | | 706/13 | |
| 2011/0137830 A1* | 6/2011 | Ozyurt | G06N 7/06 | |
| | | | 706/46 | |
| 2014/0258279 A1* | 9/2014 | Hayashi | G16B 50/30 | |
| | | | 707/723 | |
| 2014/0344199 A1* | 11/2014 | Cantin | G06N 3/086 | |
| | | | 706/13 | |
| 2015/0286611 A1* | 10/2015 | Moll | G06F 17/13 | |
| | | | 708/102 | |
| 2015/0379075 A1* | 12/2015 | Hara | G06F 17/11 | |
| | | | 707/713 | |
| 2017/0255872 A1* | 9/2017 | Hamze | G06F 9/32 | |
| 2019/0156229 A1* | 5/2019 | Tee | G06N 20/00 | |
| 2019/0244110 A1* | 8/2019 | Qiu | G06N 3/126 | |
| 2019/0295009 A1* | 9/2019 | Bailey | G06Q 10/047 | |
| 2020/0364088 A1 | 11/2020 | Ashwathnarayan et al. | | |
| 2021/0382960 A1* | 12/2021 | Parizy | G06N 5/01 | |
| 2023/0009725 A1* | 1/2023 | McDaniel | G16C 20/20 | |
| 2023/0206554 A1* | 6/2023 | Wan | G06T 17/05 | |
| | | | 345/419 | |
| 2023/0229829 A1* | 7/2023 | Hong | G06F 30/20 | |
| | | | 703/6 | |
| 2024/0134769 A1* | 4/2024 | Dave | G06F 11/3428 | |
| 2024/0176842 A1* | 5/2024 | Zucca | G06F 17/11 | |

OTHER PUBLICATIONS

Ahuja, RK et al. A survey of very large-scale neighborhood search techniques. DAM, vol. 123, Issues 1-3, Nov. 15, 2002, pp. 75-102 [online], [retrieved on Mar. 4, 2025]. Retrieved from <URL: https://www.sciencedirect.com/science/article/pii/S0166218X01003389> <DOI: https://doi.org/10.1016/S0166-218X(01)00338-9>.*

Ananth, GY et al. Parallel processing of discrete optimization problems. Encyclopedia of Microcomputers 13 (1993): 129-147. [online], [retrieved on Mar. 4, 2025]. Retrieved from the Internet <URL: https://citeseerx.ist.psu.edu/document?repid=rep1&type=pdf&doi=1de6e91d38fb925a70676ab2105110dc7539a986>.*

Chakroun, I et al. Combining multi-core and GPU computing for solving combinatorial optimization problems. JPDC vol. 73, Issue 12, Dec. 2013, pp. 1563-1577 [online], [retrieved Mar. 4, 2025]. From <URL: https://www.sciencedirect.com/science/article/pii/S0743731513001615>.*

R. Ahuja et al., "A composite very large-scale neighborhood structure for the capacitated minimum spanning tree problem", Operations Research Letters 31, 2003, 185-194.

* cited by examiner

300

110
210

500

Figure 7:
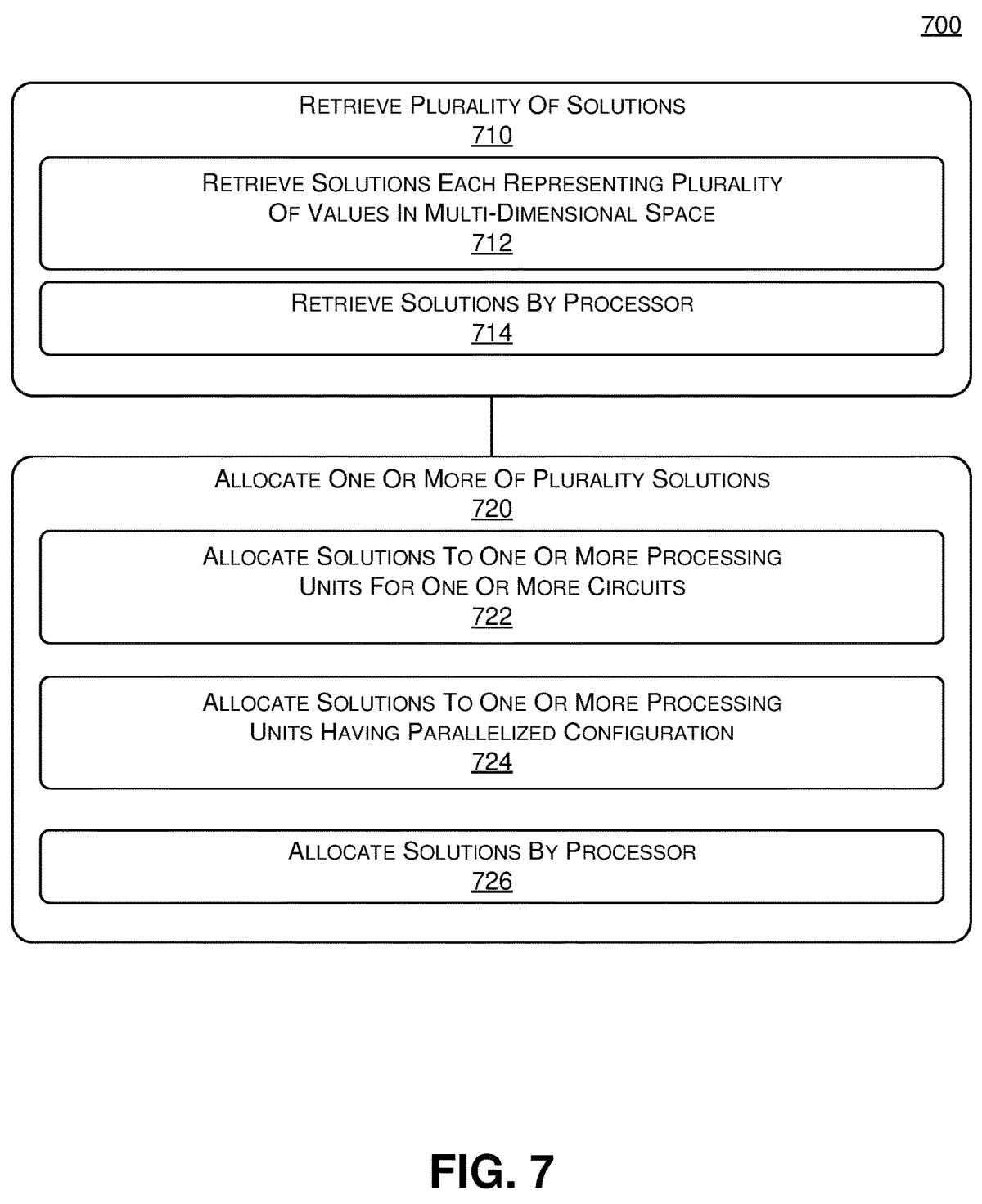

700

RETRIEVE PLURALITY OF SOLUTIONS
710

RETRIEVE SOLUTIONS EACH REPRESENTING PLURALITY
OF VALUES IN MULTI-DIMENSIONAL SPACE
712

RETRIEVE SOLUTIONS BY PROCESSOR
714

ALLOCATE ONE OR MORE OF PLURALITY SOLUTIONS
720

ALLOCATE SOLUTIONS TO ONE OR MORE PROCESSING
UNITS FOR ONE OR MORE CIRCUITS
722

ALLOCATE SOLUTIONS TO ONE OR MORE PROCESSING
UNITS HAVING PARALLELIZED CONFIGURATION
724

ALLOCATE SOLUTIONS BY PROCESSOR
726

Figure 8:
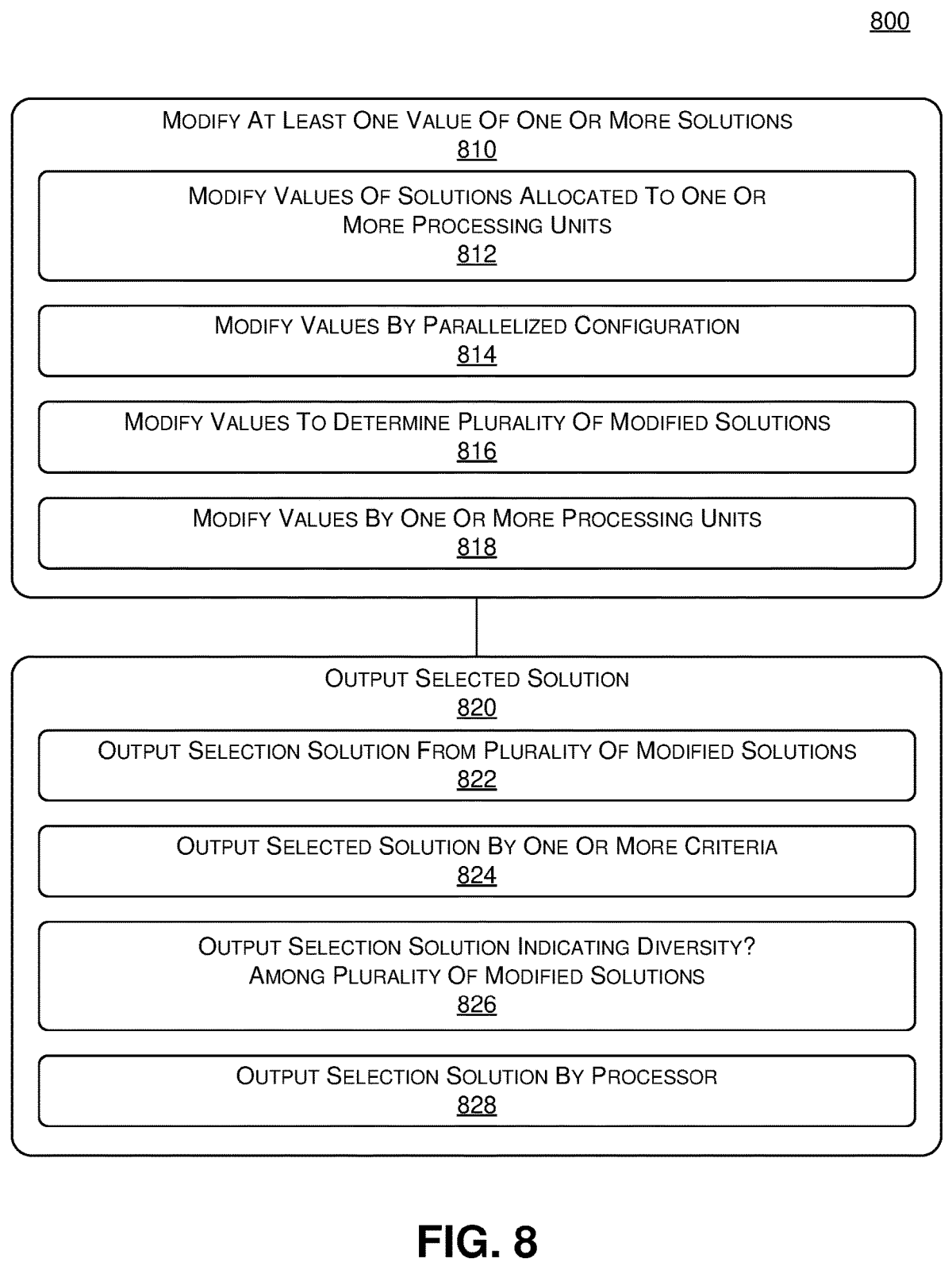

MODIFY AT LEAST ONE VALUE OF ONE OR MORE SOLUTIONS
810

MODIFY VALUES OF SOLUTIONS ALLOCATED TO ONE OR
MORE PROCESSING UNITS
812

MODIFY VALUES BY PARALLELIZED CONFIGURATION
814

MODIFY VALUES TO DETERMINE PLURALITY OF MODIFIED SOLUTIONS
816

MODIFY VALUES BY ONE OR MORE PROCESSING UNITS
818

OUTPUT SELECTED SOLUTION
820

OUTPUT SELECTION SOLUTION FROM PLURALITY OF MODIFIED SOLUTIONS
822

OUTPUT SELECTED SOLUTION BY ONE OR MORE CRITERIA
824

OUTPUT SELECTION SOLUTION INDICATING DIVERSITY?
AMONG PLURALITY OF MODIFIED SOLUTIONS
826

OUTPUT SELECTION SOLUTION BY PROCESSOR
828

MEMORY
1004

I/O COMPONENTS
1014

CPU(S)
1006

POWER SUPPLY
1016

GPU(S)
1008

PRESENTATION
COMPONENT(S)
1018

COMM. INTERFACE
1010

LOGIC UNIT(S)
1020

I/O PORT(S)
1012

1002

PROCESSOR ARCHITECTURE FOR OPTIMIZED PARALLELIZED SEARCH

CROSS-REFERENCE TO RELATED APPLICATIONS

This application claims the benefit of and priority to U.S. Provisional Application No. 63/451,552, filed Mar. 11, 2023, the disclosure of which is incorporated herein by reference in its entirety.

BACKGROUND

Computational optimization technologies can require significant computational resources to perform optimization in useful time frames. The solution space for performing computational optimization can be very large; at the same time, various approaches can have significant computational complexity, making it difficult to generate solutions in useful time frames. For example, exhaustive searches can have factorial complexity. Some approaches use sequential heuristics-based techniques focused on filtering strategies, but can still require large cache utilization or other significant computational resource usage.

SUMMARY

Embodiments of the present disclosure relate to using parallel processing architectures, including but not limited to graphics processing units (GPUs), to solve complex computational problems. Such problems can include, for example and without limitation, combinatorial problems or other problems with a large set of objectives and constraints, such as to identify solutions that minimize or maximize the objectives.

In contrast to conventional systems, such as those describe above, systems and methods in accordance with the present disclosure can more efficiently use computational resources to identify solutions to various such problems that meet target criteria. Systems and methods in accordance with the present disclosure can implement an end-to-end parallel optimization system (e.g., parallel optimization engines) to perform operations such as diversity management of solution searching and genetic and/or evolutionary searching of solutions (e.g., for approximation an optimal state or solution). For example, various operations throughout the solution search and/or detection process, from identifying initial candidate solutions through refining or selecting solutions to output, can be allocated to selected units of a plurality of parallel processing units. In some implementations, the system can use a data structure arranged to facilitate more effective parallel processing operations. Thus, a technical solution for a processor architecture for optimized parallelized search is provided.

At least one aspect relates to a processor. The processor can include one or more circuits. The processor can retrieve a plurality of solutions, at least one solution of the plurality of solutions representing a plurality of values in a multi-dimensional space. The processor can allocate, to one or more processing units associated with the one or more circuits, one or more of the plurality of solutions. The processor can modify, by the one or more processing units, at least one value of the one or more solutions allocated to the one or more processing units, to determine a plurality of modified solutions. The processor can output, from the plurality of modified solutions, a selected solution based on one or more criteria indicating a diversity among the plurality of modified solutions, a selected solution.

For example, the processor can generate the plurality of solutions using the one or more processing units according to a parallelized configuration of the one or more processing units. For example, the processor can augment, using the one or more processing units, one or more of the modified solutions to correspond to the multi-dimensional space. For example, the processor can modify, using one or more values within a subset of the multi-dimensional space according to a criterion that defines a search of the subset, the at least one value of the one or more solutions being allocated to the one or more processing units.

For example, the criterion may correspond to a threshold distance from the one or more of the plurality of solutions and at least one heuristic to search the multidimensional space outside of the threshold distance. For example, the criterion may correspond to a threshold distance from the one or more of the plurality of solutions within which to search the multi-dimensional space. For example, the criterion may correspond to a threshold distance from the one or more of the plurality of solutions within which to search the multi-dimensional space and a criterion to randomly search the multi-dimensional space.

For example, the processor can determine, according to a threshold corresponding to one or more of the plurality of solutions, that the one or more criteria satisfy the threshold to indicate the diversity. For example, the processor can include output, according to the determination that the one or more criteria satisfy the threshold to indicate the diversity, the selected solution. For example, the processor can determine, according to a threshold relative to one or more of the plurality of solutions, that the one or more criteria satisfy the threshold to indicate a second diversity. For example, the processor can exclude, according to the determination that the one or more criteria satisfy the threshold to indicate the second diversity, the selected solution. For example, the one or more circuits are to output the selected solution according to one or more objective functions.

At least one aspect relates to a system. The system can include one or more processing units to execute one or more operations. The operations can include retrieving a plurality of solutions, at least one solution of the plurality of solutions representing a plurality of values in a multi-dimensional space. The operations can include allocating, to one or more processors associated with the one or more processing units, one or more of the plurality of solutions. The operations can include modifying, by the one or more processors, at least one value of the one or more solutions allocated to the one or more processors, to determine a plurality of modified solutions. The operations can include outputting, by the one or more processing units, a selected solution from the plurality of modified solutions, according to one or more criteria indicating a diversity among the plurality of modified solutions.

For example, the system can generate the plurality of solutions using the one or more processing units according to the parallelized configuration, the plurality of solutions. For example, the system can augment, using the one or more processing units, one or more of the modified solutions to correspond to the multi-dimensional space. For example, the system can modify, using one or more values within a subset of the multi-dimensional space according to a criterion that defines a search of the subset, the at least one value of the one or more solutions allocated to the one or more processing units.

At least one aspect relates to a method. The method can include retrieving, by a processor, a plurality of solutions, at least one solution among the plurality of solutions representing a plurality of values in a multidimensional space. The method can include allocating, by the processor to one or more processing units, one or more of the plurality of solutions. The method can include modifying, by the one or more processing units according to the parallelized configuration, at least one value of the one or more solutions allocated to the one or more processing units, to determine a plurality of modified solutions. The method can include outputting, by the one or more processing units, from the plurality of modified solutions, according to one or more criteria indicating a diversity among the plurality of modified solutions, a selected solution.

For example, the method can include generating, by the processor using the one or more processing units according to a parallelized configuration, the plurality of solutions. For example, the method can include modifying, by the processor using one or more values within a subset of the multi-dimensional space according to a criterion that defines a search of the subset, the at least one value of the one or more solutions allocated to the one or more processing units. For example, the criterion can correspond to at least one of a threshold distance from the one or more of the plurality of solutions and at least one heuristic to search the multidimensional space outside of the threshold distance, a threshold distance from the one or more of the plurality of solutions within which to search the multi-dimensional space, or a threshold distance from the one or more of the plurality of solutions within which to search the multi-dimensional space and a criterion to randomly search the multi-dimensional space.

For example, the method can include determining, by the processor according to a threshold relative to one or more of the plurality of solutions, that the one or more criteria satisfy the threshold to indicate the diversity. For example, the method can include outputting, according to the determination that the one or more criteria satisfy the threshold to indicate the diversity, the selected solution. For example, the method can include determining, by the processor according to a threshold relative to one or more of the plurality of solutions, that the one or more criteria satisfy the threshold to indicate a second diversity. For example, the method can include excluding, by the processor according to the determination that the one or more criteria satisfy the threshold to indicate the second diversity, the selected solution.

At least one aspect is directed to a method that can include retrieving, by a processor, a plurality of solutions each representing a plurality of values in a multi-dimensional space. The method can include allocating, by the processor to one or more processing units associated with the one or more circuits and having a parallelized configuration, one or more of the plurality of solutions. The method can include modifying, by the one or more processing units according to the parallelized configuration, at least one value of the one or more solutions allocated to the one or more processing units, to determine a plurality of modified solutions. The method can include outputting, by the processor, from the plurality of modified solutions, according to one or more criteria indicating a diversity among the plurality of modified solutions, a selected solution.

For example, the method can include generating, by the processor using the one or more processing units according to the parallelized configuration, the plurality of solutions. For example, the method can include augmenting, using the one or more processing units according to the parallelized configuration, one or more of the modified solutions to correspond to the multi-dimensional space. For example, the method can include modifying, by the processor using one or more values within a subset of the multi-dimensional space according to a criterion that defines a search of the subset, the at least one value of the one or more solutions allocated to the one or more processing units. For example, the criterion can correspond to a threshold distance from the one or more of the plurality of solutions and at least one heuristic to search the multidimensional space outside of the threshold distance. For example, the criterion can correspond to a threshold distance from the one or more of the plurality of solutions within which to search the multi-dimensional space. For example, the criterion can correspond to a threshold distance from the one or more of the plurality of solutions within which to search the multi-dimensional space and a criterion to randomly search the multi-dimensional space. For example, the method can include determining, by the processor according to a threshold relative to one or more of the plurality of solutions, that the one or more criteria satisfy the threshold to indicate the diversity. The method can include outputting, according to the determination that the one or more criteria satisfy the threshold to indicate the diversity, the selected solution.

The processors, systems, and/or methods described herein can be implemented by or included in at least one of a system associated with an autonomous or semi-autonomous machine (e.g., an in-vehicle infotainment system); a system for performing generative artificial intelligence (AI) operations; a system using one or more language models (e.g., large language models (LLMs)); a system for performing simulation operations; a system for performing digital twin operations; a system for performing light transport simulation; a system for performing collaborative content creation for 3D assets; a system for performing deep learning operations; a system implemented using an edge device; a system implemented using a robot; a system for generating or presenting virtual reality (VR) content, augmented reality (AR) content, and/or mixed reality (MR) content; a system for performing conversational AI operations; a system for generating synthetic data; a system incorporating one or more virtual machines (VMs); a system implemented at least partially in a data center; or a system implemented at least partially using cloud computing resources.

BRIEF DESCRIPTION OF THE FIGURES

The present systems and methods for processor architectures for parallelized search are described in detail below with reference to the attached drawing figures, wherein:

FIG. 7 is a block diagram of an example method of parallelized search using parallel processing architectures, in accordance with some embodiments of the present disclosure; and FIG. 8 is a block diagram of an example method of parallelized search using parallel processing architectures, in accordance with some embodiments of the present disclosure.

DETAILED DESCRIPTION

Figure 1:
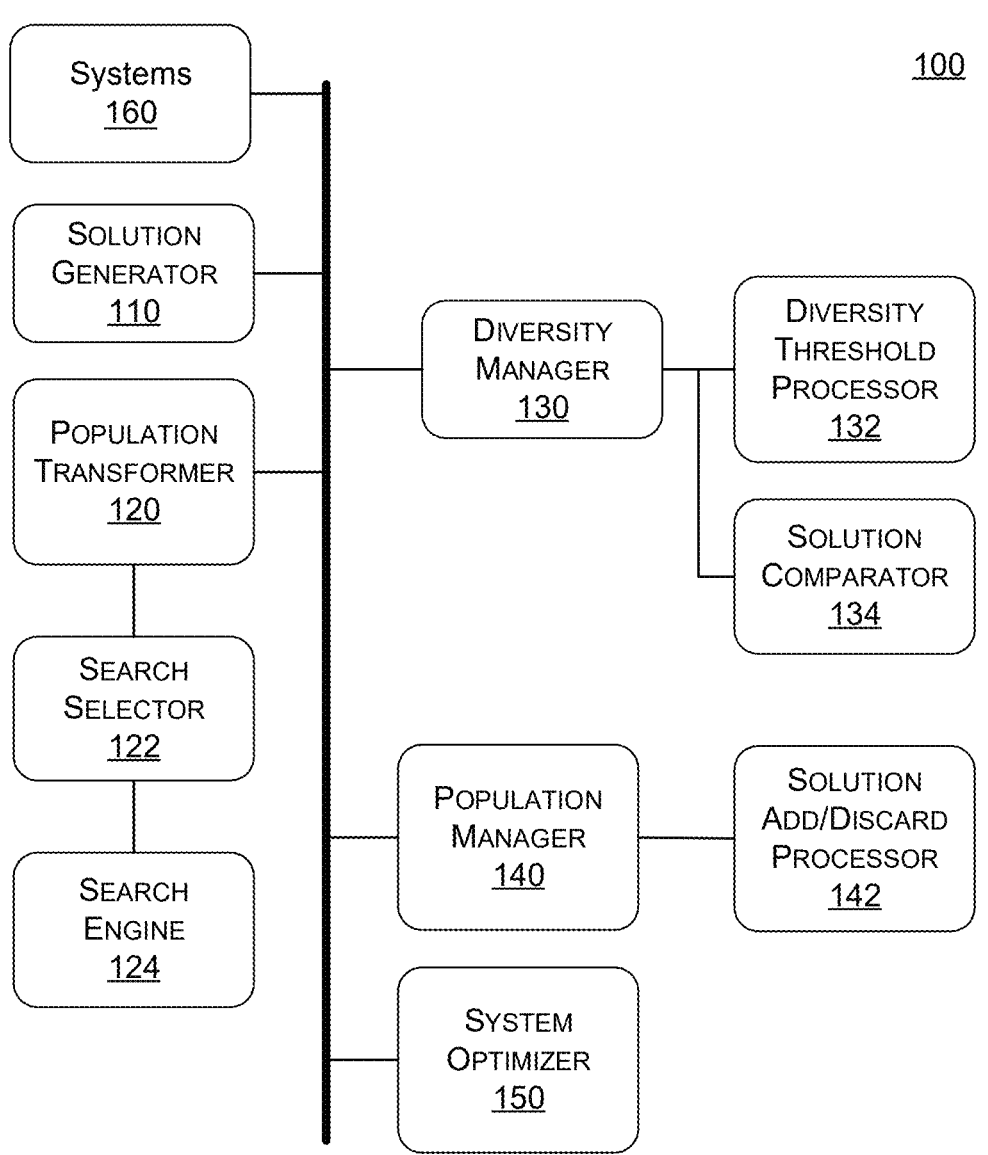
FIG. 1 is a block diagram of an example system to implement parallelized search using parallel processing architectures, in accordance with some embodiments of the present disclosure.

Systems and methods are disclosed that are related to processor architectures for parallelized search, including but not limited to graphics processing units (GPUs), to solve complex computational problems. Such problems can include, for example and without limitation, combinatorial problems or other problems with a large set of objectives and constraints, such as to identify solutions that minimize or maximize the objectives. Such problems can have high complexity, such as factorial complexity. Conventional technologies for identifying solutions, such as sequential heuristics techniques (which may focus on filtering strategies and/or utilizing large caches, for example), may thus require significant computational resources to search for solutions.

Systems and methods in accordance with the present disclosure can more efficiently use computational resources to identify solutions to various such problems that meet target criteria. Systems and methods in accordance with the present disclosure implement an end-to-end parallel optimization system (e.g., parallel optimization engine) to perform operations such as diversity management of solution searching and genetic and/or evolutionary searching of solutions (e.g., for approximation an optimal state or solution). For example, various operations throughout the solution search and/or detection process, from identifying initial candidate solutions through refining or selecting solutions to output, can be allocated to selected units of a plurality of parallel processing units. In some implementations, the system can use a data structure arranged to facilitate more effective parallel processing operations, such as for mapping paths in cycle finding algorithms.

This technical solution can concurrently generate a plurality of candidate solutions to a given problem via a processor architecture configured to maximize speed of execution of operations as discussed herein and speed of identification of solutions by operations as discussed herein. For example, the system can apply any of various algorithms, which may be designed for the given problem, to determine the candidate solutions. In some implementations, the system allocates one or more processing units of a plurality of parallel processing units for determining any one or more candidate solutions, such as to generate groups ("islands") of solutions having an initial level of diversity. For example, a level of diversity can correspond to a difference between two or more solutions based on one or more aspects of each solution. For example, an aspect can correspond to a graph structure or values corresponding to one or more nodes or edges of a graph structure, or any combination thereof. A difference between two or more solutions can indicate a divergence between the two or more solutions. For example, the divergence can have a quantitative value corresponding to or according to one or more differences between two or more solutions. Execution of operations according to the processor architecture as discussed herein can provide a technical improvement to allow the system to avoid prematurely converging the population of candidate solutions, by, for example, at least one computational search process as discussed herein that is distinct in nature from a manual search process. Execution of operations according to the processor architecture as discussed herein can provide a technical improvement allowing for an overall greater search of the search space represented by possible solutions by, for example, at least one computational search process as discussed herein that is distinct in nature from a manual search process.

The system can modify at least a subset of the candidate solutions to determine modified solutions (e.g., to improve the candidate solutions, such as to increase a score of the candidate solutions with respect to one or more objectives). For example, the system can apply one or more genetic and/or evolutionary operations to one or more candidate solutions to determine the modified solutions. The genetic and/or evolutionary operations can include, for example and without limitation, crossover, mutation, and/or selection operations to modify the candidate solutions. In some implementations, the system can determine that the modified solutions do not satisfy one or more constraints of the problems (as an example, a given modified solution for a routing problem may not include points corresponding to each location to be passed through on a solution route) and can modify the modified solutions to satisfy the one or more constraints.

In some implementations, the system can use the candidate solutions and/or modified solutions as initial data points for performing any of various local and/or neighborhood search operations. For example, the local searches can be performed to evaluate (e.g., with respect to the objectives for the problem) one or more adjacent solutions to the respective initial data points (e.g., adjacent solutions having one or more variable values that are within a threshold of the initial data points).

The systems and methods described herein may be used for a variety of purposes, by way of example and without limitation, for synthetic data generation, machine control, machine locomotion, machine driving, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, generative AI, light transport simulation (e.g., ray-tracing, path tracing, etc.), collaborative content creation for 3D assets, cloud computing and/or any other suitable applications.

Disclosed embodiments may be comprised in a variety of different systems such as systems 160 for performing conversational AI operations, systems implementing one or more language models—such as large language models (LLMs) that process textual, image, sensor, audio, and/or other data types, systems for performing synthetic data generation operations, automotive systems (e.g., a control system for an autonomous or semi-autonomous machine, a perception system for an autonomous or semi-autonomous machine), systems implemented using a robot, aerial systems, medical systems, boating systems, smart area monitoring systems, systems for performing deep learning operations, systems for performing simulation operations, systems for performing digital twin operations, systems implemented using an edge device, systems incorporating one or more virtual machines (VMs), systems implemented at least partially in a data center, systems for performing light transport simulation, systems for performing collaborative content creation for 3D assets, systems implemented at least partially using cloud computing resources, and/or other types of systems.

FIG. 1 is an example computing environment including a system 100, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. The system 100 can include any function, model (e.g., machine learning model), operation, routine, logic, or instructions to perform functions such as configuring and/or operating solution generator 110 as described herein.

As illustrated by way of example in FIG. 1, an example system 100 can include at least a solution generator 110, a population transformer 120, a diversity manager 130, a population manager 140, and a system optimizer 150. The solution generator 110 can generate one or more data structures corresponding to one or more solutions. A solution can correspond to an object in a set of objects in a domain. For example, a solution can correspond to a state among one or more states that can correspond to a domain. For example, a domain can correspond to one or more states, and can correspond to one or more states that can exist in a domain. For example, a solution can include one or more parameters having one or more values. For example, a solution can correspond to a collection of one or more parameters having corresponding values, and a domain can correspond to a collection of parameters including all values that can be assigned to each of the parameters. Thus, for example, a solution can correspond to portion of a domain having one or more defined parameters. A solution having a defined value for all parameters can correspond to a point in the domain. For example, a solution can correspond to an optimization of one or more parameters in a domain. An optimization can correspond to an identification of an absolute maximum, a relative maximum, an absolute minimum, a relative minimum, an expected output, an expected input, a portion of a domain, a search space, or any combination thereof, but is not limited thereto. A search space can include a portion of the domain that includes a subset of parameters of the domain, a subset of one or more values of one or more of the parameters, or any combination thereof. For example, the search space can correspond to a portion of the domain that corresponds to one or more parameters or values of parameters. For example, the search space can correspond to a portion of the domain that excludes one or more parameters or values of parameters.

The data structure corresponding to a given solution can include one or more parameters, values, or any combination thereof, and one or more links between one or more of the parameters or values thereof. For example, each solution can correspond to the data structure. The data structure can include a graph. The graph can be at least partially directed or partially undirected, and can include one or more nodes and one or more edges. The graph can represent one or more given parameters or values of parameters of a given solution associated with navigation through and/or resource allocation for locations and/or paths represented by the nodes and edges. For example and without limitation, the graph can represent a given problem and/or solution for delivery navigation problems.

A population of solutions can correspond to one or more solutions that satisfy one or more criteria, heuristics, or any combination thereof. For example, a population of solutions can correspond to a plurality of solutions that each satisfy a fitness function of a genetic evolutionary model. For example, as described further with reference to FIG. 3, a population 320 can include a plurality of solutions 322, 324 and 326. For example, each of the solutions 322, 324 and 326 can correspond to instances of the solution as discussion herein. For example, each of the solutions 322, 324 and 326 can include corresponding parameters indicative of the domain. Each parameter can have a value indicative of the solution in the domain. The solution, the domain, the parameters, and the values can correspond to various practical applications as discussed herein, but are not limited to those practical applications as discussed herein.

For example, the solution can correspond to a configuration of one or more hardware devices, processors, registers, memory devices, network controllers, or any combination thereof that correspond to a particular computer system or type of computer system. For example, the solution can correspond to a configuration of one or more hardware devices to operate the one or more hardware devices to satisfy one or more execution parameters. For example, execution parameters can include, but are not limited to, system latency, processor latency, memory latency, network latency, or any combination thereof. The solution generator 110 can be at least partially distributed/implemented/configured across one or more processor cores, each corresponding to one or more CPUs, GPUs, or any combination thereof as discussed herein. For example, the solution generator 110 can include one or more processes, threads, or any combination thereof, allocated to one or more processor cores, each corresponding to one or more CPUs, GPUs, or any combination thereof as discussed herein. Thus, the solution generator 110 can provide a technical improvement of generating a large volume of solutions with a reduced computational delay, by the technical solution of a solution generator 110 allocated to a particular configuration of GPUs, CPUs, or any combination thereof.

The population transformer 120 can generate and modify one or more data structures corresponding to one or more solutions. For example, the population transformer 120 can store or receive one or more data structures including or referencing one or more solutions generated by the solution generator 110. The population transformer 120 can modify one or more solutions of a set of solutions corresponding to a population of solutions.

The population transformer 120 can modify one or more populations to include one or more solutions. For example, the population transformer 120 can identify one or more solutions that correspond to a portion of a search space absent or underrepresented in a population. For example, the population transformer 120 can determine absence or under-representation of solutions that correspond to a portion of the search space according to a distribution criterion that indicates a particular minimum number or percentage of solutions corresponding to a portion of the search space.

The population transformer 120 can include a search selector 122 and a search engine 124. The search selector 122 can select one or more search engines 124 and can allocate one or more portions of one or more populations to one or more search engines 124. For example, the search selector 122 can select one or more searches to be performed concurrently. For example, the search selector 122 can allocate one or more searches to one or more GPUs, DPUs, or CPUs according to a property of one or more populations or properties of one or more solutions. For example, the search selector 122 can parallelize execution of searches across multiple GPUs (or other processors) according to a determination that data structures of one or more solutions of the population are executable across multiple GPUs (processors). For example, the search selector 122 can determine that one or more portions of a graph corresponding to a solution share a number of edges or connections below a predetermined threshold. For example, the search selector 122 can determine that one or more graphs corresponding to distinct solutions share a number of edges or connections below a predetermined threshold. Accordingly, the search selector 122 can parallelize respective portions of the respective solutions having edges or connections above the predetermined threshold by allocating those portions to distinct GPUs, DPUs, or CPUs for concurrent operation.

The search engine 124 can execute one or more searches corresponding to one or more search operations. A search operation can include one or more operations to identify one or more solutions from the search space according to one or more criteria for how the one or more solutions are identified. For example, a search operation can correspond to a search according to a particular traversal technique, and can be optimized for one or more of time of execution, thoroughness of traversal, minimization of computing resources allocated, maximization of parallel computing resources allocated, or any combination thereof. For example, the search engine 124 can distribute execution of a search of a population to one or more GPUs, according to a determination that one or more operations of the search engine 124 are executable across multiple GPUs. For example, the search engine 124 can determine that one or more search operations lack a dependency requiring sequential execution. For example, the search engine 124 can determine that one or more search operations lack a dependency requiring sequential traversal. Accordingly, the search selector 122 can parallelize respective portions of the respective search operations by allocating those portions to distinct GPUs, DPUs, or CPUs for concurrent operation.

The selector 122 can select, for the search engine 124 to perform, at least one of a local search, an approximate search, or a neighborhood search (e.g., a very large neighborhood search (VLNS)). The search engine 124 can perform the local search as search operations including nodes of a graph within a predetermined distance of each other, as measured in number of intervening nodes. The search engine 124 can perform the approximate search as search operations including flexible matching criteria that may indicate a search for partial matches of content or structure, or analogous matches of content or structure. The search engine 124 can perform the neighborhood search as search operations including nodes within a predetermined domain, as measured in a subset or selection of parameters or values or parameters of the domain. For example, the neighborhood search can include search operations in a domain.

The diversity manager 130 can determine a diversity (e.g., diversity score, diversity metric) of one or more first solutions (e.g., of a given population or other group of solutions) with respect to the given population. The diversity can represent a difference between two or more solutions based on one or more aspects of the solution. For example, an aspect can correspond to a graph structure or values corresponding to one or more nodes or edges of a graph structure, or any combination thereof. A difference between two or more solutions can indicate a divergence between the two or more solutions. For example, the divergence can have a quantitative value corresponding to or according to one or more differences between two or more solutions.

The diversity manager 130 can determine the diversity by applying the one or more first solutions and/or the given population as input to any of various rules, heuristics, algorithms, models, or other functions or operations. For example, the diversity manager 130 can identify one or more solutions corresponding to one or more heuristics indicating a difference in one or more parameters or values of parameters of one or more solutions. For example, the diversity manager 130 can compare one or more portions of one or more data structures corresponding to one or more respective solutions. For example, the diversity manager 130 can compare one or more portions of graphs corresponding to one or more solutions of a population. For example, the diversity manager 130 can determine that one or more portions of a graph corresponding to a plurality of solutions to be compared collectively share a number of edges or connections below a predetermined threshold. For example, the diversity manager 130 can determine that one or more graphs corresponding to distinct solutions share a number of edges or connections below a predetermined threshold.

In some implementations, the diversity manager 130 can parallelize respective groups of the respective solutions having edges or connections above the predetermined threshold by allocating those groups to distinct GPUs, DPUs, or CPUs for concurrent operation of those GPUs, DPUs, or CPUs to which those groups are allocated.

The diversity manager 130 can include, in some implementations, a diversity threshold processor 132 and a solution comparator 134, which can be used to perform various operations described herein (including but not limited to with respect to the diversity manager 130) to evaluate diversity of solutions in order to control generation and/or modification of solutions. The diversity threshold processor 132 can identify, determine, or modify a diversity threshold corresponding to one or more solutions or one or more populations. For example, the diversity threshold processor 132 can determine the diversity threshold according to a heuristic for inclusion of a solution in a population according to the diversity of the solution. The solution comparator 134 can determine whether one or more populations or one or more solutions satisfy one or more heuristics according to one or more diversity metrics.

In some implementations, the solution comparator 134 can parallelize execution of one or more determinations according to one or more properties of one or more corresponding heuristics according one or more processors or processor types. For example, the solution comparator 134 can determine that a scalar heuristic corresponds to a scalar value indicating a number of nodes and can allocate determinations of whether solutions satisfy various scalar heuristics to respective CPUs. For example, the solution comparator 134 can determine that a geometric heuristic corresponds to a subgraph indicating a particular arrangement of nodes and can allocate determinations of whether solutions satisfy various geometric heuristics to respective GPUs. Thus, the diversity engine can provide at least a technical improvement of more efficient allocation of computational resources according to structure of data corresponding to particular computational input, beyond the capacity of manual processes to allocate or execute in a viable time period.

The population manager 140 can modify a population to include or exclude one or more solutions. For example, the population manager 140 can modify a population in response to a determination of the diversity manager 130 or any component thereof. The population manager 140 can include a solution add/discard processor 142. The solution add/discard processor 142 can add solutions to or remove solutions from a population.

In some implementations, the solution add/discard processor 142 can parallelize execution of add/discard operations according to populations. For example, the solution add/discard processor 142 can allocate add/discard operations corresponding to a particular population to a particular GPU or CPU having a number of parallel processor cores corresponding to the number of add/discard operations associated with the particular population. Thus, the population manager 140 can provide at least the technical improvement of more efficient allocation of computational resources according to structure of data corresponding to particular computational input, beyond the capacity of manual processes to allocate or execute in a viable time period.

The optimizer 150 can modify a computing system (e.g., a system that implements one or more components of the system 100) according to one or more solutions or heuristics. For example, the optimizer 150 can modify configuration of one or more processors or processors cores of a system corresponding to a solution. For example, a configuration can correspond to one or more instructions to allocate one or more operations to one or more corresponding processors or processor cores. For example, the configuration can reduce computer resources or reduce a time period corresponding to execution of one or more instructions corresponding to the solution. For example, the configuration can correspond to a configuration of a system optimized to execute a particular model trained or updated via artificial intelligence at a higher speed, higher accuracy, or any combination thereof. The optimizer 150 can apply a plurality of configurations to a system, to provide at least a technical improvement of concurrent optimized configurations to one or more portions of a system, beyond the capability of manual processes to achieve optimized execution of multiple types or instances of models or instructions.

Figure 2:
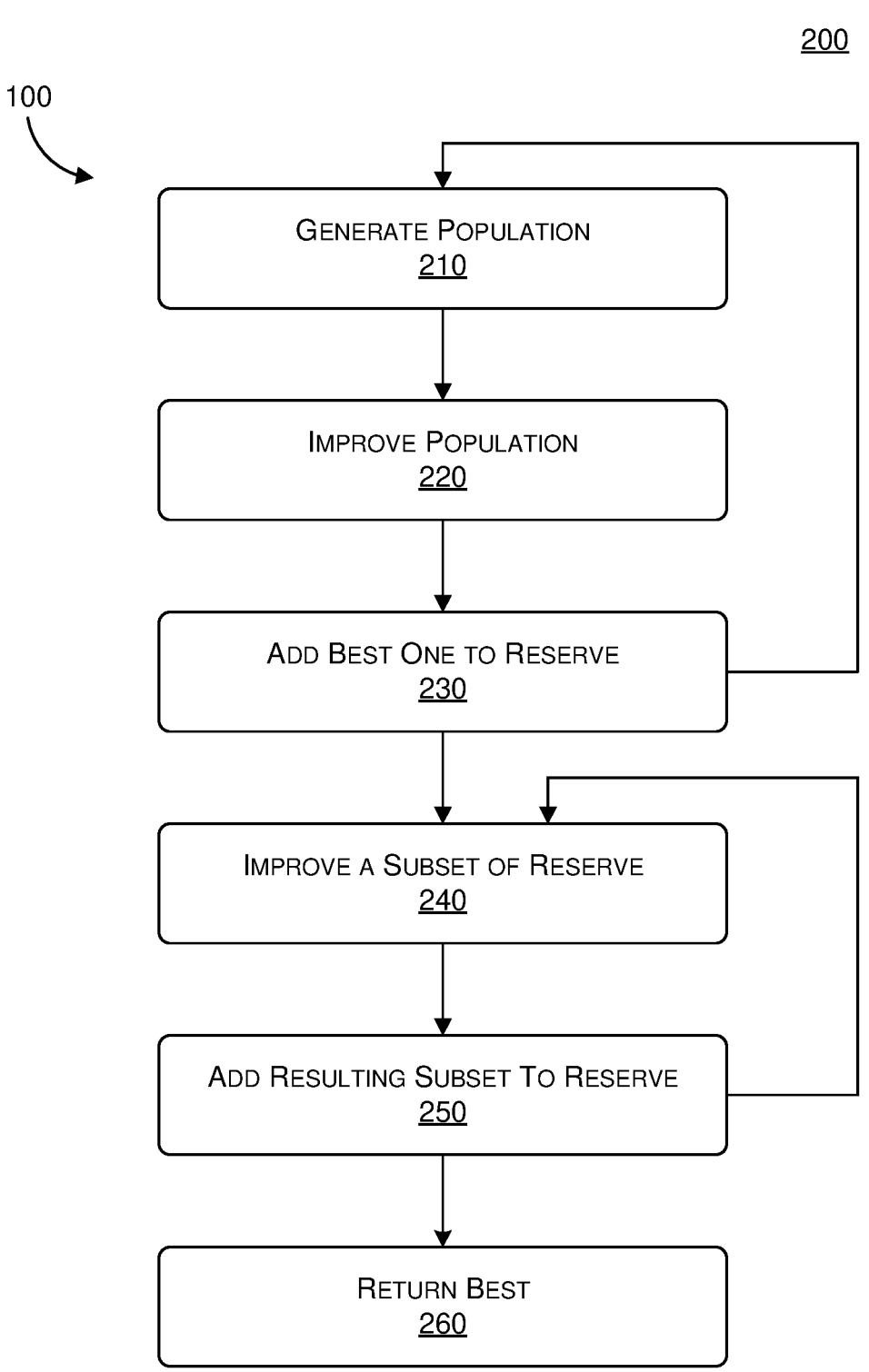
FIG. 2 is a block diagram of an example system process to implement parallelized search using parallel processing architectures, in accordance with some embodiments of the present disclosure.

FIG. 2 depicts an example system process, according to the present disclosure. At least one of the systems or architectures of FIG. 1, 9, 10 or 11, any component thereof, or any combination thereof, can perform method 200.

At 210, the method 200 can generate a population. For example, the population transformer 120 can generate a population. For example, the population can include one or more solutions, each including corresponding graphs. At 220, the method 200 can improve a population. For example, the diversity manager 130 or the population manager 140 can improve a population by determining whether any solutions satisfy any heuristic or metric indicating that the solution is to be added to the population. For example, the diversity manager 130 can determine whether one or more solutions satisfy one or more heuristics as discussed herein.

At 230, the method 200 can add an identified solution to a reserve corresponding to a population. For example, the solution add/discard processor 142 can add the identified solution to a reserve corresponding to a population. For example, a reserve can correspond to a set of one or more solutions of a population that satisfy one or more heuristics for inclusion in the population. For example, the heuristics can correspond to at least one of diversity, fitness, or similarity among one or more solutions. For example, the identified solution can correspond to a solution having at least one metric that satisfies a selection threshold corresponding to diversity, fitness, or similarity. For example, the selection threshold can indicate a minimum or maximum diversity between a plurality of solutions. For example, the selection threshold can indicate a minimum or maximum fitness of one or more solutions. For example, the selection threshold can indicate a minimum or maximum similarity between a plurality of solutions.

At 240, the method 200 can improve a subset of a reserve corresponding to a population. For example, the population manager 140 can improve a subset of a reserve corresponding to a population. For example, a subset of a reserve corresponding to a population can correspond to a subset of a total number of solutions of the population. For example, the population transformer 120 or the population manager 140 can identify, select, or extract a subset of solutions of a population that correspond to a particular search engine or engines allocated to the solutions of the subset. For example, the population transformer 120 can allocate a subset of a reserve to a predetermined number of GPUs, DPUs, or CPUs configured to execute at least part of a search engine optimized to traverse one or more of the solutions of the subset of the reserve of the population. At 250, the method 200 can add a resulting subset to a reserve corresponding to a population. For example, the solution add/discard processor 142 can add a resulting subset to a reserve corresponding to a population as discussed herein, for inclusion in a population or a reserve of a population. At 260, the method 200 can return an identified solution. For example, the solution add/discard processor 142 can return the identified solution to the optimizer 150.

Figure 3:
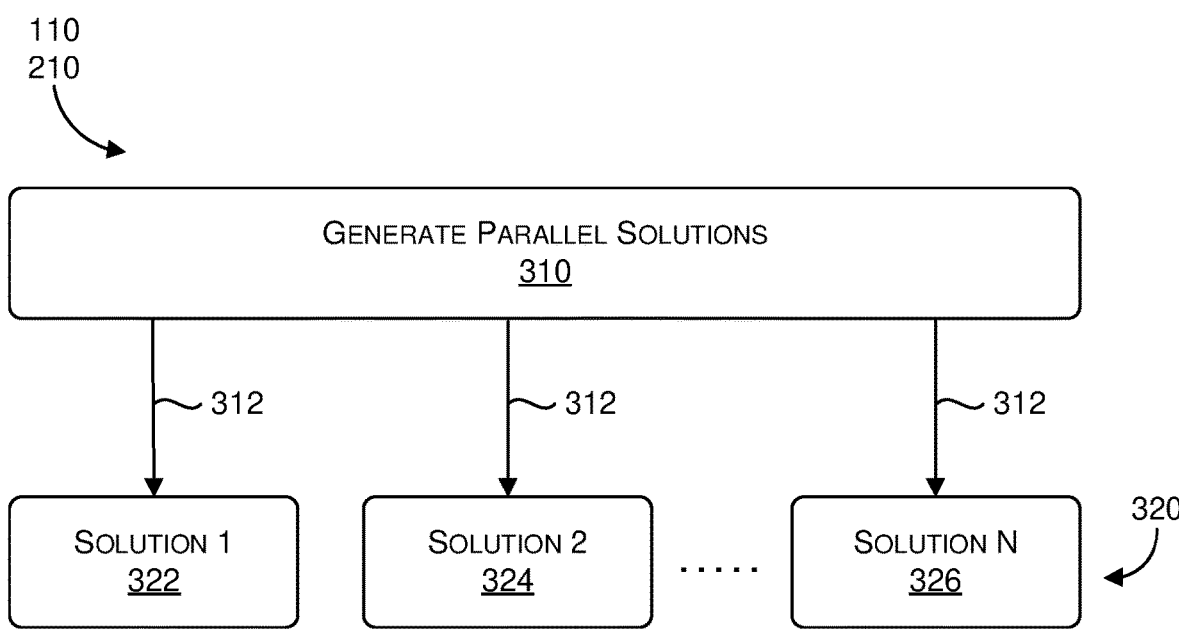
FIG. 3 is a block diagram of an example population generation process to implement parallelized search using parallel processing architectures, in accordance with some embodiments of the present disclosure.

FIG. 3 depicts an example population generation process, according to the present disclosure. At least one of the systems or architectures of FIG. 1, 9, 10 or 11, any component thereof, or any combination thereof, can perform method 300. At 310, the method 300 can generate parallel solutions. For example, the solution generator 110 can generate parallel solutions as discussed herein. At 312, the method 300 can generate parallel solutions via one or more corresponding solution processes. For example, the solution generator 110 can generate parallel solutions via one or more corresponding solution processes. For example, each of the solution processes can correspond to processes, threads, or any combination thereof, allocated to particular processors, processor types, processor cores, or processor core types. For example, the method 300 can generate a solution set. For example, the solution generator 110 can generate a solution set including one or more solutions corresponding to a predetermined solution seed or based on one or more aspects of one or more existing solutions of a population. For example, the method 300 can output parallel solutions. For example, the solution generator 110 can generate output parallel solutions via one or more corresponding solution processes. For example, each of the solution processes can correspond to processes, threads, or any combination thereof, allocated to particular processors, processor types, processor cores, or processor core types.

Figure 4:
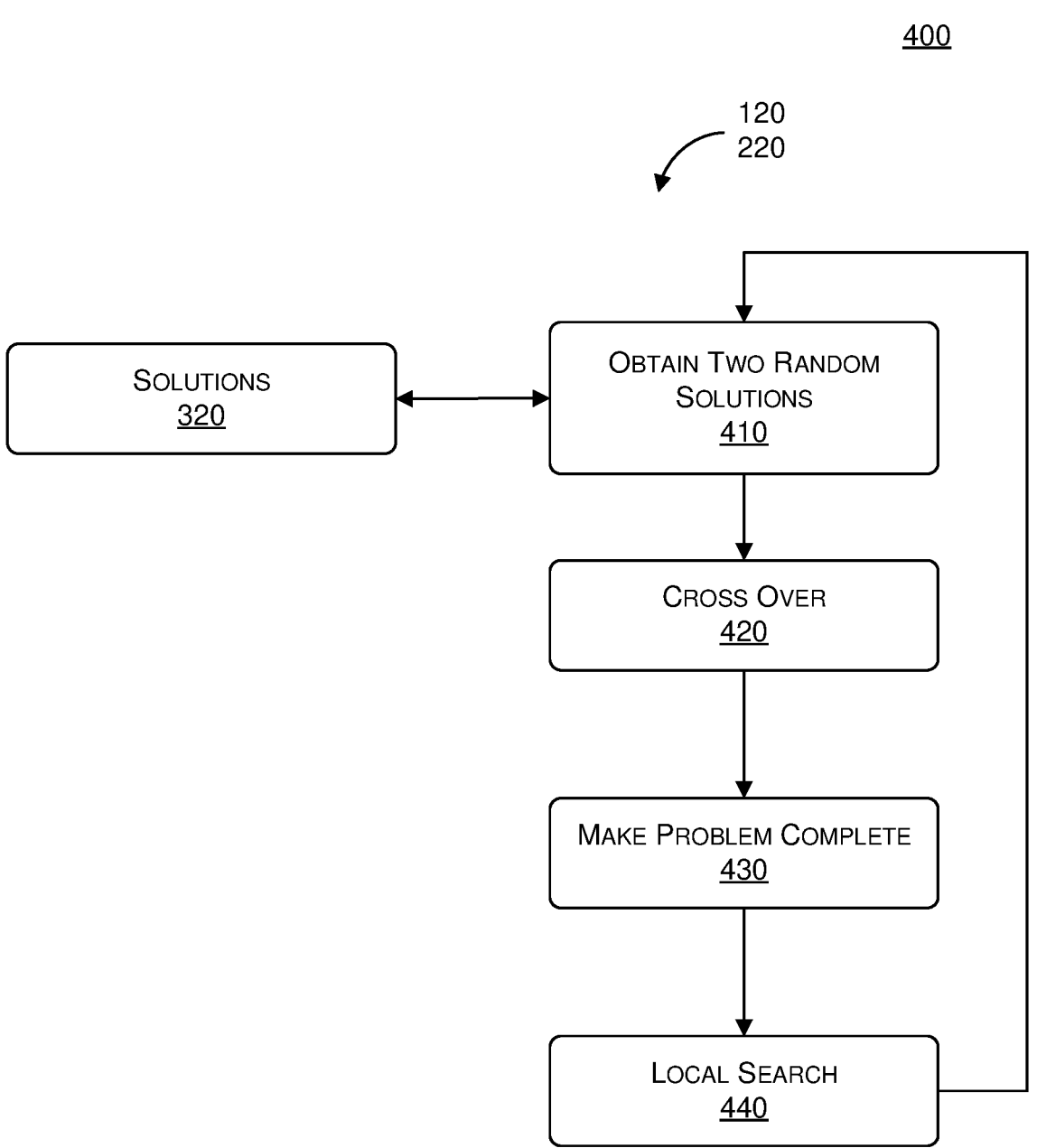
FIG. 4 is a block diagram of an example solution improvement process to implement parallelized search using parallel processing architectures, in accordance with some embodiments of the present disclosure.

FIG. 4 depicts an example solution improvement process, according to the present disclosure. At least one of the systems or architectures of FIG. 1, 9, 10 or 11, any component thereof, or any combination thereof can perform method 400. At 410, the method 400 can obtain two random solutions. For example, the population transformer 120 can obtain two random solutions. The population transformer 120 can obtain any number of solutions, and is not limited to any number (e.g., 2) of solutions over any particular time period or process, for example. The population transformer 120 can obtain solutions by any selection criteria, and is not limited to true or pseudorandom selection of any solutions, for example.

At 420, the method 400 can perform a cross-over operation on a plurality of solutions. For example, the population transformer 120 can cross over solutions. For example, where solutions include data structures corresponding to graphs, the population transformer 120 can divide each solution into one or more subgraphs and can join one or more of the divided portions into new graphs having distinct graph structures from each other and from the parent graphs from which they were generated.

At 430, the method 400 can make a problem complete. For example, the population transformer 120 can make a problem complete. For example, completing a problem can correspond to adding a data structure to a solution. For example, the added data structure can correspond to instructions directed to a portion of a population excluded by the solution (e.g., to incorporate data from other solutions of the population). For example, a population can be directed to finding a solution for an optimized configuration for a given problem having 100 criteria (e.g., criteria such as constraints and/or objectives for any of a variety of problems, including but not limited to navigation or route-finding problems, or machine, processor, and/or simulation problems), and a solution can include an optimized configuration for 90 of the given criteria. Here, the population transformer 120 can complete the solution by adding solution data for the remaining 10 criteria. The added data structure can be optimized to the 10 processors or can be a configuration of the 10 processors. The population transformer 120 can then proceed to optimize the population with the solution completed for the population. At 440, the method 400 can perform a local search. For example, the search engine 124 can perform a local search. The method 400 is not limited to perform a local search and can perform any number or type of search at least as discussed herein.

Figure 5:
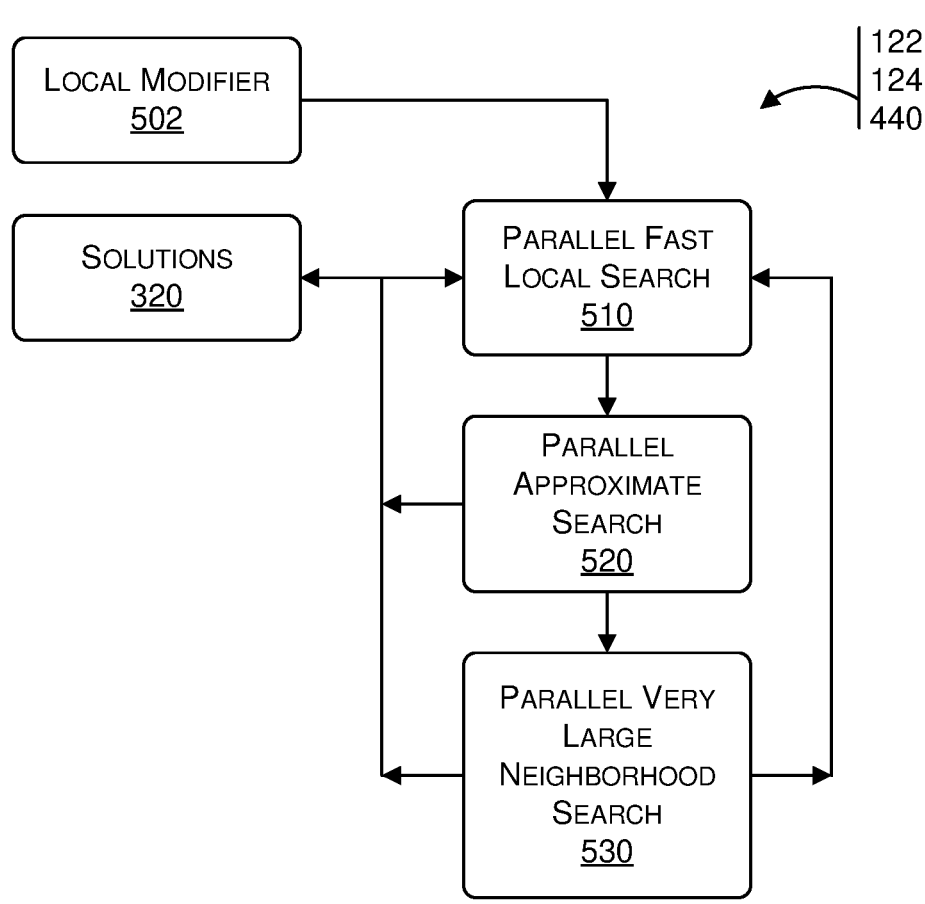
FIG. 5 is a block diagram of an example search process to implement parallelized search using parallel processing architectures, in accordance with some embodiments of the present disclosure.

FIG. 5 depicts an example search process, according to the present disclosure. At least one of the systems or architectures of FIG. 1, 9, 10 or 11, any component thereof, or any combination thereof can perform method 500.

At 502, the method 500 can obtain a local modifier. For example, the search engine 124 can obtain a local modifier. For example, the local modifier can correspond to a metric or heuristic that indicates a portion of a population to be searched.

At 510, the method 500 can perform a parallel fast local search. For example, the search engine 124 can perform a parallel fast local search. For example, the parallel fast local search can correspond to a search of a graph including nodes within a predetermined distance of each other, as measured in number of intervening nodes. For example, the parallel fast local search can correspond to a search of a graph that allows traversal across a predetermined number of nodes. The parallel fast local search can be distributed across a plurality of GPUs, DPUs, or CPUs, or types of GPUs, DPUs, or CPUs, as discussed herein.

At 520, the method 500 can perform a parallel approximate search. For example, the search engine 124 can perform a parallel approximate search. For example, the parallel approximate search can correspond to a search of a graph including flexible matching criteria that may indicate a search for partial matches of content or structure, or analogous matches of content or structure. For example, the parallel approximate search can correspond to a search of a graph that allows traversal across a predetermined number of nodes. The parallel approximate search can be distributed across a plurality of GPUs, DPUs, or CPUs, or types of GPUs, DPUs, or CPUs, as discussed herein.

At 520, the method 500 can perform a parallel very large neighborhood search. For example, the search engine 124 can perform a parallel very large neighborhood search. For example, the parallel very large neighborhood search can correspond to a search of a graph including nodes within a second predetermined distance of each other, as measured in number of intervening nodes, which is greater than the predetermined distance of the parallel fast local search. For example, the parallel very large neighborhood search can correspond to a search of a graph that allows traversal across a predetermined number of nodes that is greater than the corresponding number of nodes of the parallel fast local search. The parallel very large neighborhood search can be distributed across a plurality of GPUs, DPUs, or CPUs, or types of GPUs, DPUs, or CPUs, as discussed herein.

Figure 6:
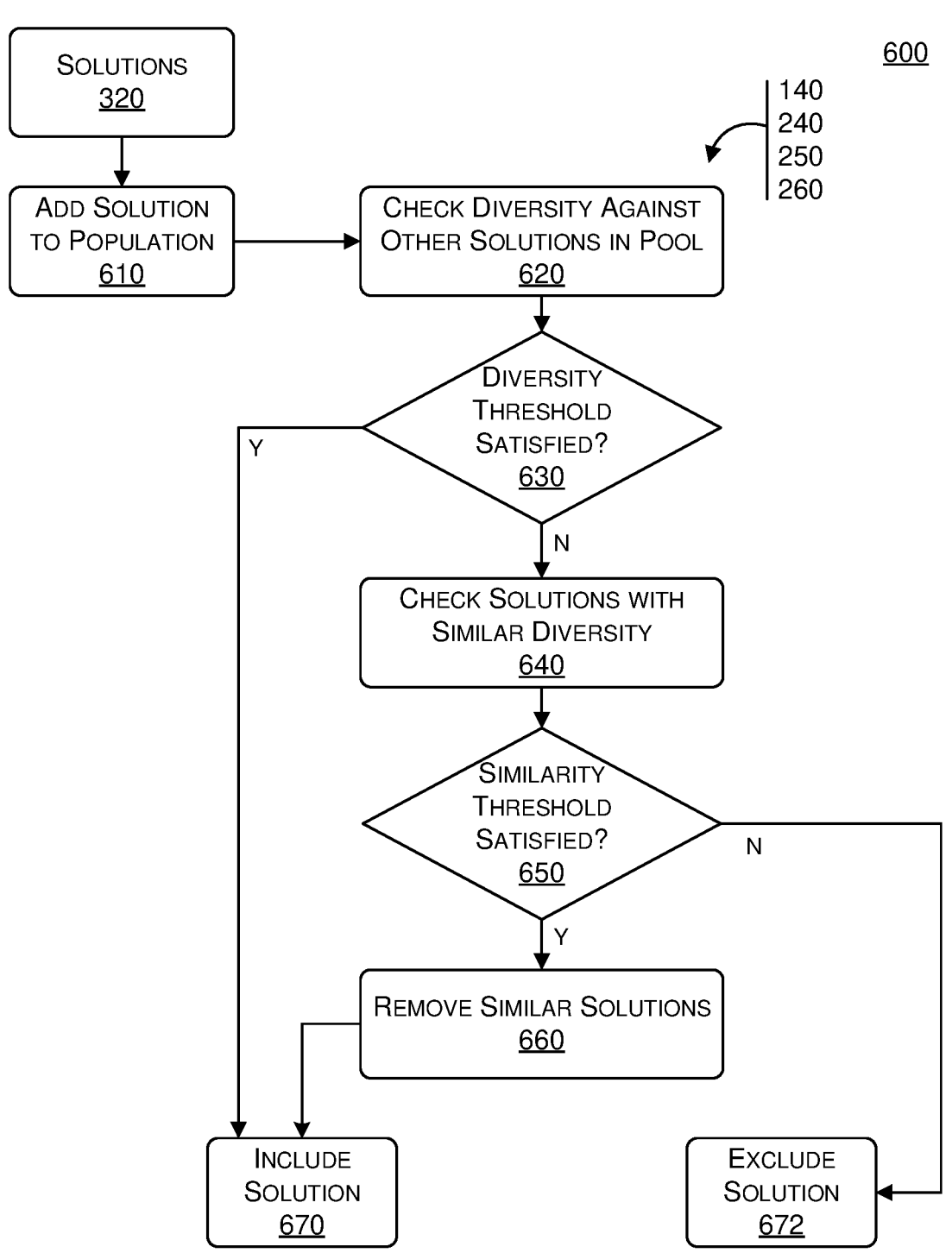
FIG. 6 is a block diagram of an example population management process to implement parallelized search using parallel processing architectures, in accordance with some embodiments of the present disclosure.

FIG. 6 depicts an example population management process, according to the present disclosure. At least one of the systems or architectures of FIG. 1, 9, 10 or 11, any component thereof, or any combination thereof, can perform method 600. At 610, the method 600 can add a solution to a population. For example, the solution add/discard processor 142 can add a solution to a population.

At 620, the method 600 can check diversity against other solutions in a pool. For example, the diversity manager 130 can check diversity of a selected solution against other solutions in a pool. At 630, the method 600 can determine whether a diversity threshold is satisfied. For example, the diversity manager 130 can determine whether a diversity threshold is satisfied. For example, a diversity threshold can correspond to a minimum degree of difference between structures of one or more solutions over which a solution is indicated as diverse. At 640, the method 600 can check for solutions with similar diversity. For example, the diversity manager 130 can check for solutions with similar diversity by determining whether a plurality of solutions have a degree of difference below a minimum degree of difference under which a solution is indicated as similar. At 650, the method 600 can determine whether a similarity threshold is satisfied. For example, the diversity manager 130 can determine whether a similarity threshold is satisfied by parallelizing a determination across multiple GPUs, DPUs, or CPUs as discussed herein. At 660, the method 600 can remove similar solutions. For example, the solution add/discard processor can remove similar solutions.

At 670, the method 600 can include a solution. For example, the solution add/discard processor 142 can include a solution in a population that satisfies both diversity and similarity thresholds. For example, the solution add/discard processor 142 can include a solution in a population with a diversity metric exceeding a minimum diversity threshold and a similarity metric less than a maximum similarity threshold. At 672, the method 600 can exclude a solution. For example, the solution add/discard processor 142 can exclude a solution in a population that does not satisfy one or both of diversity and similarity thresholds. For example, the solution add/discard processor 142 can exclude a solution in a population with a diversity metric below a minimum diversity threshold or a similarity metric above a maximum similarity threshold.

FIG. 7 depicts an example method of parallelized search, according to the present disclosure. At least one of the systems or architectures of FIG. 1, 9, 10 or 11, any component thereof, or any combination thereof, can perform method 700.

At 710, the method 700 can retrieve a plurality of solutions. For example, the method can include generating, by the processor using the one or more processing units according to the parallelized configuration, the plurality of solutions. At 712, the method 700 can retrieve solutions, each representing a plurality of values in a multi-dimensional space. For example, a multidimensional space can correspond to nodes or edges of a graph, each having one or more corresponding values. At 714, the method 700 can retrieve solutions by a processor.

At 720, the method 700 can allocate one or more of the plurality of solutions. At 722, the method 700 can allocate solutions to one or more processing units for the one or more circuits. At 724, the method 700 can allocate solutions to one or more processing units having a parallelized configuration. For example, a parallelized configuration can correspond to allocation to one or more GPUs, DPUs, or CPUs as discussed herein to concurrently execute one or more instructions. At 726, the method 700 can allocate solutions by the processor.

FIG. 8 depicts an example method of parallelized search, according to the present disclosure. At least one of the systems or architectures of FIG. 1, 9, 10 or 11, any component thereof, or any combination thereof, can perform method 800.

At 810, the method 800 can modify at least one value of the one or more solutions. For example, the method can include augmenting, using the one or more processing units according to the parallelized configuration, one or more of the modified solutions to correspond to the multi-dimensional space. For example, the method can include modifying, by the processor using one or more values within a subset of the multi-dimensional space according to a criterion that defines a search of the subset, the at least one value of the one or more solutions allocated to the one or more processing units. For example, the method can include identifying where the criterion corresponds to a threshold distance from the one or more of the plurality of solutions and can include using at least one heuristic to search the multidimensional space outside of the threshold distance. The method can include identifying where the criterion corresponds to a threshold distance from the one or more of the plurality of solutions within which to search the multi-dimensional space. The method can include identifying where the criterion corresponds to a threshold distance from the one or more of the plurality of solutions within which to search the multi-dimensional space, and can include using a criterion to randomly search the multi-dimensional space. At 812, the method 800 can modify values of solutions allocated to the one or more processing units. At 814, the method 800 can modify values according to the parallelized configuration. At 816, the method 800 can modify values to determine a plurality of modified solutions. At 818, the method 800 can modify values by the one or more processing units.

At 820, the method 800 can output a selected solution. For example, the method can include determining, by the processor according to a threshold relative to one or more of the plurality of solutions, that the one or more criteria satisfy the threshold to indicate the diversity. The method can include output, according to the determination that the one or more criteria satisfy the threshold to indicate the diversity, the selected solution. At 822, the method 800 can output a selected solution from the plurality of modified solutions. At 824, the method 800 can output a selected solution according to one or more criteria. At 826, the method 800 can output a selected solution indicating a diversity among the plurality of modified solutions. At 828, the method 800 can output a selected solution by the processor.

Figure 9:
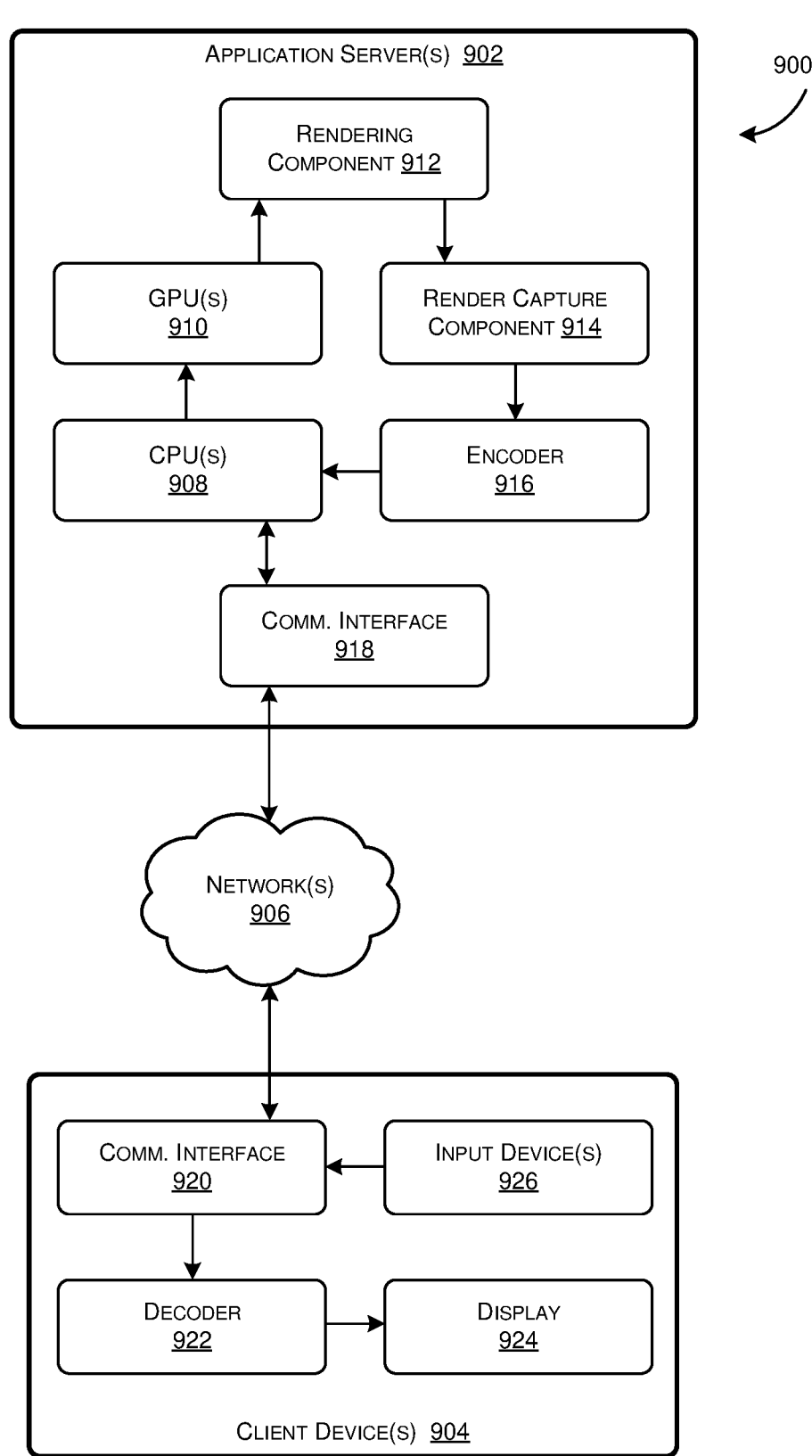
FIG. 9 is a block diagram of an example network system to implement parallelized search using parallel processing architectures, in accordance with some embodiments of the present disclosure.

FIG. 9 depicts an example network system, according to the present disclosure. As illustrated by way of example in FIG. 9, an example network system 900 can include at least application server(s) 902 (which may include similar components, features, and/or functionality to the example computing device 1000 of FIG. 10), client device(s) 904 (which may include similar components, features, and/or functionality to the example computing device 1000 of FIG. 10), and network(s) 906 (which may be similar to the network(s) described herein). In some embodiments of the present disclosure, the system 900 may be implemented to perform diffusion model training and runtime operations. The application session may correspond to a game streaming application (e.g., NVIDIA GeFORCE NOW), a remote desktop application, a simulation application (e.g., autonomous or semi-autonomous vehicle simulation), computer aided design (CAD) applications, virtual reality (VR) and/or augmented reality (AR) streaming applications, deep learning applications, and/or other application types. For example, the system 900 can be implemented to update a population of solutions by a parallelized processor architecture.

In the system 900, for an application session, the client device(s) 904 may only receive input data in response to inputs to the input device(s) 926, transmit the input data to the application server(s) 902, receive encoded display data from the application server(s) 902, and display the display data on the display 924. As such, the more computationally intense computing and processing is offloaded to the application server(s) 902 (e.g., rendering—in particular ray or path tracing—for graphical output of the application session is executed by the GPU(s) 910 of the game server(s) 902). In other words, the application session is streamed to the client device(s) 904 from the application server(s) 902, thereby reducing the requirements of the client device(s) 904 for graphics processing and rendering.

For example, with respect to an instantiation of an application session, a client device 904 may be displaying a frame of the application session on the display 924 according to receiving the display data from the application server(s) 902. The client device 904 may receive an input to one of the input device(s) 926 and generate input data in response. The client device 904 may transmit the input data to the application server(s) 902 according to the communication interface 920 and over the network(s) 906 (e.g., the Internet), and the application server(s) 902 may receive the input data according to the communication interface 918. The CPU(s) 908 may receive the input data, process the input data, and transmit data to the GPU(s) 910 that causes the GPU(s) 910 to generate a rendering of the application session. For example, the input data may be representative of a movement of a character of the user in a game session of a game application, firing a weapon, reloading, passing a ball, turning a vehicle, etc. The rendering component 912 may render the application session (e.g., representative of the result of the input data), and the render capture component 914 may capture the rendering of the application session as display data (e.g., as image data capturing the rendered frame of the application session). The rendering of the application session may include ray or path-traced lighting and/or shadow effects, computed using one or more parallel processing units—such as GPUs 910, which may further employ the use of one or more dedicated hardware accelerators or processing cores to perform ray or path-tracing techniques—of the application server(s) 902. In some embodiments, one or more virtual machines (VMs)—e.g., including one or more virtual components, such as vGPUs, vCPUs, etc.—may be used by the application server(s) 902 to support the application sessions. The encoder 916 may then encode the display data to generate encoded display data and the encoded display data may be transmitted to the client device 904 over the network(s) 906 according to the communication interface 918. The client device 904 may receive the encoded display data according to the communication interface 920 and the decoder 922 may decode the encoded display data to generate the display data. The client device 904 may then display the display data according to the display 924.

Figure 10:
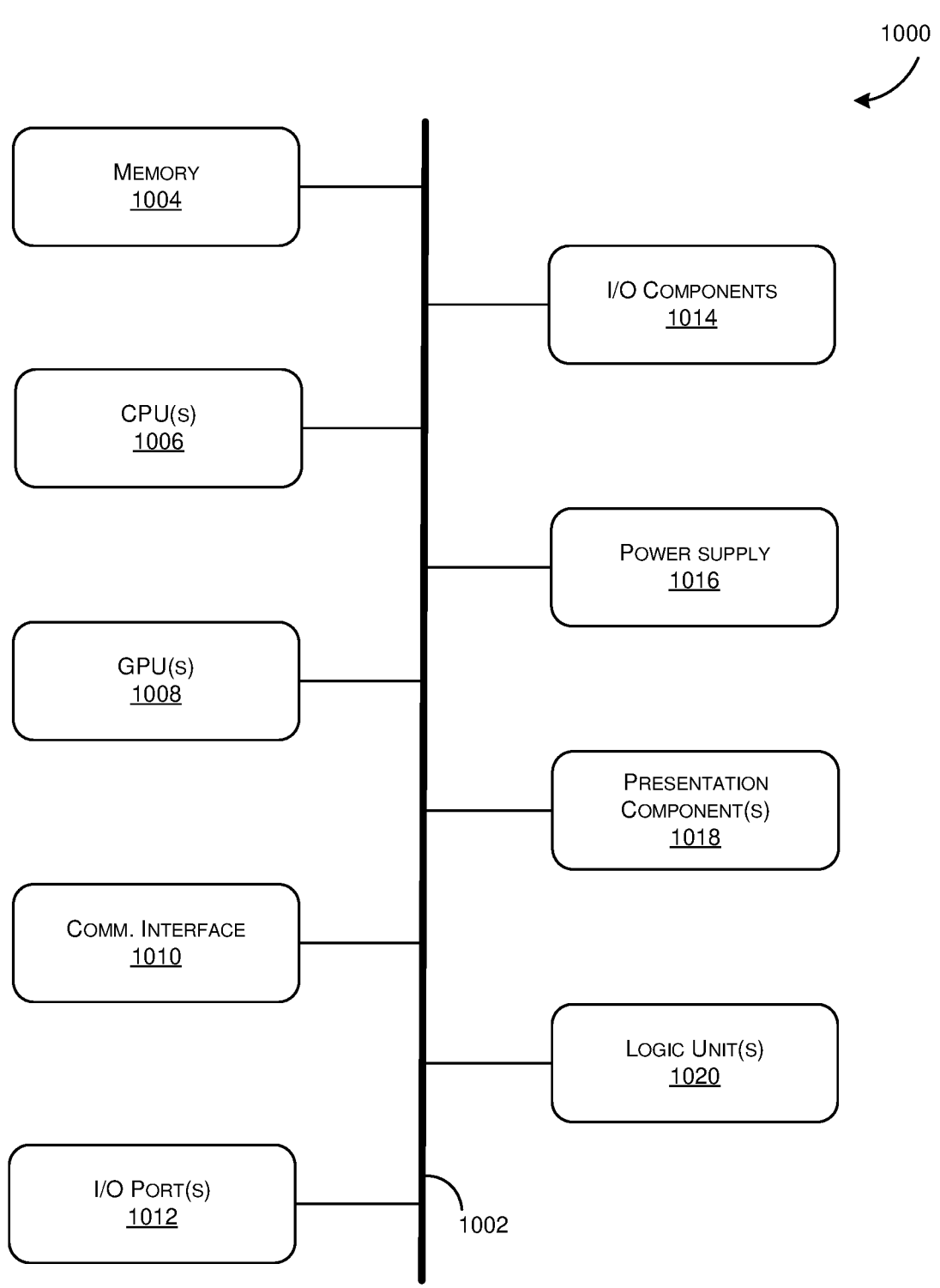
FIG. 10 is a block diagram of an example computer system to implement parallelized search using parallel processing architectures, in accordance with some embodiments of the present disclosure.

FIG. 10 depicts an example computer system, according to the present disclosure. As illustrated by way of example in FIG. 10, an example computer system 1000 can include at least an interconnect system 1002 that directly or indirectly couples the following devices: memory 1004, one or more central processing units (CPUs) 1006, one or more graphics processing units (GPUs) 1008, a communication interface 1010, input/output (I/O) ports 1012, input/output components 1014, a power supply 1016, one or more presentation components 1018 (e.g., display(s)), and one or more logic units 1020. In at least one embodiment, the computing device(s) 1000 may comprise one or more virtual machines (VMs), and/or any of the components thereof may comprise virtual components (e.g., virtual hardware components). For non-limiting examples, one or more of the GPUs 1008 may comprise one or more vGPUs, one or more of the CPUs 1006 may comprise one or more vCPUs, and/or one or more of the logic units 1020 may comprise one or more virtual logic units. As such, a computing device(s) 1000 may include discrete components (e.g., a full GPU dedicated to the computing device 1000), virtual components (e.g., a portion of a GPU dedicated to the computing device 1000), or a combination thereof.

Although the various blocks of FIG. 10 are shown as connected according to the interconnect system 1002 with lines, this is not intended to be limiting and is for clarity only. For example, in some embodiments, a presentation component 1018, such as a display device, may be considered an I/O component 1014 (e.g., if the display is a touch screen). As another example, the CPUs 1006 and/or GPUs 1008 may include memory (e.g., the memory 1004 may be representative of a storage device in addition to the memory of the GPUs 1008, the CPUs 1006, and/or other components). In other words, the computing device of FIG. 10 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 10.

The interconnect system 1002 may represent one or more links or busses, such as an address bus, a data bus, a control bus, or a combination thereof. The interconnect system 1002 may be arranged in various topologies, including but not limited to bus, star, ring, mesh, tree, or hybrid topologies. The interconnect system 1002 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 1006 may be directly connected to the memory 1004. Further, the CPU 1006 may be directly connected to the GPU 1008. Where there is direct, or point-to-point connection between components, the interconnect system 1002 may include a PCIe link to carry out the connection. In these examples, a PCI bus need not be included in the computing device 1000.

The memory 1004 may include any of a variety of computer-readable media. The computer-readable media may be any available media that may be accessed by the computing device 1000. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1004 may store computer-readable instructions (e.g., that represent a program(s) and/or a program element(s), such as an operating system). Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1000. As used herein, computer storage media does not comprise signals per se.

The computer storage media may embody computer-readable instructions, data structures, program modules, and/or other data types in a modulated data signal, such as a carrier wave or other transport mechanism, and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 1006 may be configured to execute at least some of the computer-readable instructions to control one or more components of the computing device 1000 to perform one or more of the methods and/or processes described herein. The CPU(s) 1006 may each include one or more cores (e.g., one, two, four, eight, twenty-eight, seventy-two, etc.) that are capable of handling a multitude of software threads simultaneously. The CPU(s) 1006 may include any type of processor and may include different types of processors depending on the type of computing device 1000 implemented (e.g., processors with fewer cores for mobile devices and processors with more cores for servers). For example, depending on the type of computing device 1000, the processor may be an Advanced RISC Machines (ARM) processor implemented using Reduced Instruction Set Computing (RISC) or an x86 processor implemented using Complex Instruction Set Computing (CISC). The computing device 1000 may include one or more CPUs 1006 in addition to one or more microprocessors or supplementary co-processors, such as math co-processors.

As discussed herein, one or more solutions or one or more populations, or any portion thereof, can be allocated to one or more of the GPU(s) 1008 or any portion thereof. In addition to or alternatively from the CPU(s) 1006, the GPU(s) 1008 may be configured to execute at least some of the computer-readable instructions to control one or more components of the computing device 1000 to perform one or more of the methods and/or processes described herein. One or more of the GPU(s) 1008 may be an integrated GPU (e.g., one or more of the CPU(s) 1006 and/or one or more of the GPU(s) 1008 may be a discrete GPU). In embodiments, one or more of the GPU(s) 1008 may be a coprocessor of one or more of the CPU(s) 1006. The GPU(s) 1008 may be used by the computing device 1000 to render graphics (e.g., 3D graphics) or perform general purpose computations. For example, the GPU(s) 1008 may be used for General-Purpose computing on GPUs (GPGPU). The GPU(s) 1008 may include hundreds or thousands of cores that are capable of handling hundreds or thousands of software threads simultaneously. The GPU(s) 1008 may generate pixel data for output images in response to rendering commands (e.g., rendering commands from the CPU(s) 1006 received according to a host interface). The GPU(s) 1008 may include graphics memory, such as display memory, for storing pixel data or any other suitable data, such as GPGPU data. The display memory may be included as part of the memory 1004. The GPU(s) 1008 may include two or more GPUs operating in parallel (e.g., according to a link). The link may directly connect the GPUs (e.g., using NVLINK) or may connect the GPUs through a switch (e.g., using NVSwitch). When combined together, each GPU 1008 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 1006 and/or the GPU(s) 1008, the logic unit(s) 1020 may be configured to execute at least some of the computer-readable instructions to control one or more components of the computing device 1000 to perform one or more of the methods and/or processes described herein. In embodiments, the CPU(s) 1006, the GPU(s) 1008, and/or the logic unit(s) 1020 may discretely or jointly perform any combination of the methods, processes and/or portions thereof. One or more of the logic units 1020 may be part of and/or integrated in one or more of the CPU(s) 1006 and/or the GPU(s) 1008 and/or one or more of the logic units 1020 may be discrete components or otherwise external to the CPU(s) 1006 and/or the GPU(s) 1008. In embodiments, one or more of the logic units 1020 may be a coprocessor of one or more of the CPU(s) 1006 and/or one or more of the GPU(s) 1008.

Examples of the logic unit(s) 1020 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Image Processing Units (IPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 1010 may include one or more receivers, transmitters, and/or transceivers that allow the computing device 1000 to communicate with other computing devices according to an electronic communication network, included wired and/or wireless communications. The communication interface 1010 may include components and functionality to allow communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 1020 and/or communication interface 1010 may include one or more data processing units (DPUs) to transmit data received over a network and/or through interconnect system 1002 directly to (e.g., a memory of) one or more GPU(s) 1008. In some embodiments, a plurality of computing devices 1000 or components thereof, which may be similar or different to one another in various respects, can be communicatively coupled to transmit and receive data for performing various operations described herein, such as to facilitate latency reduction.

The I/O ports 1012 may allow the computing device 1000 to be logically coupled to other devices including the I/O components 1014, the presentation component(s) 1018, and/or other components, some of which may be built into (e.g., integrated in) the computing device 1000. Illustrative I/O components 1014 include a microphone, mouse, keyboard, joystick, game pad, game controller, satellite dish, scanner, printer, wireless device, etc. The I/O components 1014 may provide a natural user interface (NUI) that processes air gestures, voice commands, or other physiological inputs generated by a user. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1000. The computing device 1000 may include depth cameras, such as stereoscopic camera systems, infrared camera systems, RGB camera systems, touchscreen technology, and combinations of these, for gesture detection and recognition. Additionally, the computing device 1000 may include accelerometers or gyroscopes (e.g., as part of an inertia measurement unit (EIU)) that allow detection of motion. In some examples, the output of the accelerometers or gyroscopes may be used by the computing device 1000 to render immersive augmented reality or virtual reality.

The power supply 1016 may include a hard-wired power supply, a battery power supply, or a combination thereof. The power supply 1016 may provide power to the computing device 1000 to allow the components of the computing device 1000 to operate.

The presentation component(s) 1018 may include a display (e.g., a monitor, a touch screen, a television screen, a heads-up-display (HUD), other display types, or a combination thereof), speakers, and/or other presentation components. The presentation component(s) 1018 may receive data from other components (e.g., the GPU(s) 1008, the CPU(s) 1006, DPUs, etc.), and output the data (e.g., as an image, video, sound, etc.).

Figure 11:
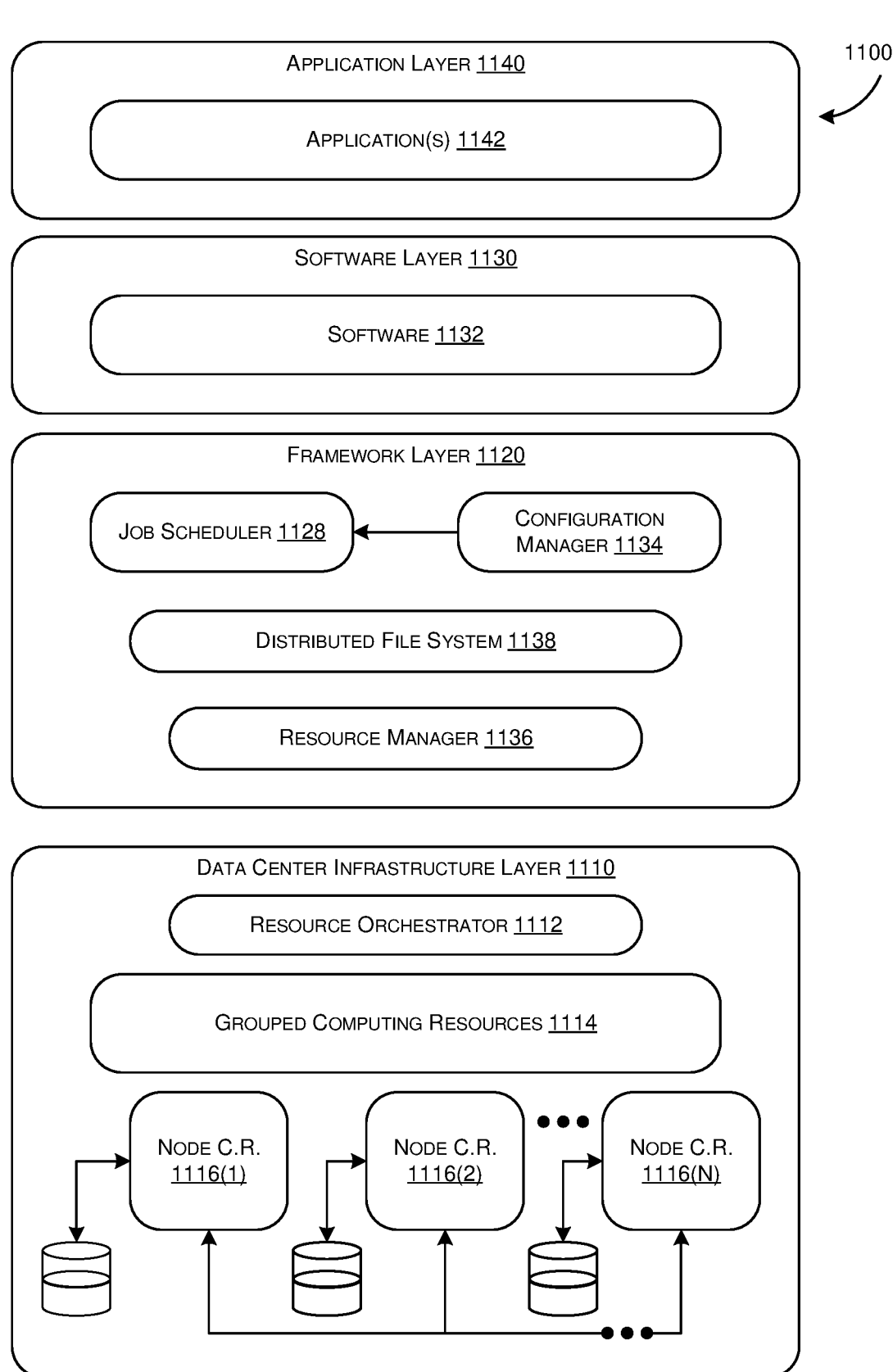
FIG. 11 is a block diagram of an example computer architecture to implement parallelized search using parallel processing architectures, in accordance with some embodiments of the present disclosure.

FIG. 11 depicts an example computer architecture, according to the present disclosure. As illustrated by way of example in FIG. 11, an example computer architecture 1100 can include at least a data center infrastructure layer 1110, a framework layer 1120, a software layer 1130, and/or an application layer 1140.

As shown in FIG. 11, the data center infrastructure layer 1110 may include a resource orchestrator 1112, grouped computing resources 1114, and node computing resources ("node C.R.s") 1116(1)-1116(N), where "N" represents any whole, positive integer. In at least one embodiment, node C.R.s 1116(1)-1116(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 1116(1)-1116(N) may correspond to a server having one or more of the above-mentioned computing resources. In addition, in some embodiments, the node C.R.s 1116(1)-1116(N) may include one or more virtual components, such as vGPUs, vCPUs, and/or the like, and/or one or more of the node C.R.s 1116(1)-1116(N) may correspond to a virtual machine (VM).

In at least one embodiment, grouped computing resources 1114 may include separate groupings of node C.R.s 1116 housed within one or more racks (not shown), or many racks housed in data centers at various geographical locations (also not shown). Separate groupings of node C.R.s 1116 within grouped computing resources 1114 may include grouped compute, network, memory or storage resources that may be configured or allocated to support one or more workloads. In at least one embodiment, several node C.R.s 1116 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 1112 may configure or otherwise control one or more node C.R.s 1116(1)-1116(N) and/or grouped computing resources 1114. In at least one embodiment, resource orchestrator 1112 may include a software design infrastructure (SDI) management entity for the data center 1100. The resource orchestrator 1112 may include hardware, software, or some combination thereof.

In at least one embodiment, as shown in FIG. 11, framework layer 1120 may include a job scheduler 1128, a configuration manager 1134, a resource manager 1136, and/or a distributed file system 1138. The framework layer 1120 may include a framework to support software 1132 of software layer 1130 and/or one or more application(s) 1142 of application layer 1140. The software 1132 or application(s) 1142 may respectively include web-based service software or applications, such as those provided by Amazon Web Services, Google Cloud and Microsoft Azure. The framework layer 1120 may be, but is not limited to, a type of free and open-source software web application framework such as Apache Spark™ (hereinafter "Spark") that may utilize distributed file system 1138 for large-scale data processing (e.g., "big data"). In at least one embodiment, job scheduler 1128 may include a Spark driver to facilitate scheduling of workloads supported by various layers of data center 1100. The configuration manager 1134 may be capable of configuring different layers, such as software layer 1130 and framework layer 1120, including Spark and distributed file system 1138 for supporting large-scale data processing. The resource manager 1136 may be capable of managing clustered or grouped computing resources mapped to or allocated for support of distributed file system 1138 and job scheduler 1128. In at least one embodiment, clustered or grouped computing resources may include grouped computing resource 1114 at data center infrastructure layer 1110. The resource manager 1136 may coordinate with resource orchestrator 1112 to manage these mapped or allocated computing resources.

In at least one embodiment, software 1132 included in software layer 1130 may include software used by at least portions of node C.R.s 1116(1)-1116(N), grouped computing resources 1114, and/or distributed file system 1138 of framework layer 1120. One or more types of software may include, but are not limited to, Internet web page search software, e-mail virus scan software, database software, and streaming video content software.

In at least one embodiment, application(s) 1142 included in application layer 1140 may include one or more types of applications used by at least portions of node C.R.s 1116(1)-1116(N), grouped computing resources 1114, and/or distributed file system 1138 of framework layer 1120. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments, such as to train, configure, update, and/or execute machine learning models of one or more components of the system 100.

In at least one embodiment, any of configuration manager 1134, resource manager 1136, and resource orchestrator 1112 may implement any number and type of self-modifying actions according to any amount and type of data acquired in any technically feasible fashion. Self-modifying actions may relieve a data center operator of data center 1100 from making possibly bad configuration decisions and possibly avoiding underutilized and/or poor performing portions of a data center.

The data center 1100 may include tools, services, software or other resources to train one or more machine learning models (e.g., train machine learning models of modifier 112) or predict or infer information using one or more machine learning models (e.g., machine learning models of modifier 112) according to one or more embodiments described herein. For example, a machine learning model(s) may be trained by calculating weight parameters according to a neural network architecture using software and/or computing resources described above with respect to the data center 1100. In at least one embodiment, trained or deployed machine learning models corresponding to one or more neural networks may be used to infer or predict information using resources described above with respect to the data center 1100 by using weight parameters calculated through one or more training techniques, such as but not limited to those described herein.

In at least one embodiment, the data center 1100 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or perform inferencing of information, such as image recognition, speech recognition, or other artificial intelligence services.

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 900 of FIG. 9—e.g., each device may include similar components, features, and/or functionality of the computing device(s) 900. In addition, where backend devices (e.g., servers, NAS, etc.) are implemented, the backend devices may be included as part of a data center 1100, an example of which is described in more detail herein with respect to FIG. 11.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 900 described herein with respect to FIG. 9. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A processor to:
retrieve, from memory, a plurality of solutions pre-stored in memory for an optimized parallelized search computation corresponding to concurrent modification of the plurality of solutions, each solution of the plurality of solutions corresponding to a unique initial candidate of a plurality of unique initial candidates and representing a plurality of values in a multi-dimensional space;
allocate, to one or more circuits of the processor, a first corresponding solution of a first unique initial candidate from the plurality of solutions, the first corresponding solution allocated for modification by a first corresponding circuit of the one or more circuits;
allocate, to the one or more circuits of the processor, a second corresponding solution of a second unique initial candidate from the plurality of solutions, the second corresponding solution allocated for modification by a second corresponding circuit of the one or more circuits;
modify, by the one or more circuits, at least one value of the first corresponding solution or the second corresponding solution of the plurality of solutions allocated to the one or more circuits to determine a plurality of modified solutions different from the plurality of solutions corresponding to the plurality of unique initial candidates retrieved from the memory;
output, from the plurality of modified solutions, a selected solution, wherein selecting the selected solution comprises:
determining a deviation metric of the plurality of modified solutions; and
selecting, as the selected solution, a modified solution of the plurality of modified solutions based on the determined deviation metric; and
cause a computation of one or more delivery navigation operations using the selected solution.

2. The processor of claim 1, wherein the one or more circuits are to:
generate the plurality of solutions using the one or more circuits according to a parallelized configuration of the one or more circuits.

3. The processor of claim 1, wherein the one or more circuits are to:
augment, using the one or more circuits, one or more of the plurality of modified solutions to correspond to the multi-dimensional space.

4. The processor of claim 1, wherein the one or more circuits are to:
modify, using one or more values within a subset of the multi-dimensional space according to a criterion that defines a search of the subset, the at least one value of the plurality of solutions being allocated to the one or more circuits;
wherein the concurrent modification corresponds to a plurality of executions on a plurality of threads of the one or more circuits.

5. The processor of claim 4, wherein the criterion corresponds to a threshold distance from one or more of the plurality of solutions and at least one heuristic to search the multi-dimensional space outside of the threshold distance.

6. The processor of claim 4, wherein the criterion corresponds to a threshold distance from one or more of the plurality of solutions within which to search the multi-dimensional space.

7. The processor of claim 4, wherein the criterion corresponds to a threshold distance from one or more of the plurality of solutions within which to search the multi-dimensional space and a criterion to search the multi-dimensional space.

8. The processor of claim 1, wherein the one or more circuits are to:
determine, according to a threshold relative to one or more of the plurality of solutions, that one or more criteria satisfy the threshold to indicate a deviation from the deviation metric; and
output, according to the determination that the one or more criteria satisfy the threshold to indicate the deviation, the selected solution.

9. The processor of claim 1, wherein the one or more circuits are to:
determine, according to a threshold corresponding to one or more of the plurality of solutions, that the deviation metric of the selected solution is less than the threshold; and
exclude, according to the determination, the selected solution.

10. The processor of claim 1, wherein the one or more circuits are to output the selected solution according to one or more objective functions.

11. The processor of claim 1, wherein the processor is comprised in at least one of:
a system comprising one or more large language models (LLMs);
a system comprising one or more generative artificial intelligence (AI) models;
a control system for an autonomous or semi-autonomous machine;
a perception system for an autonomous or semi-autonomous machine;
a system for performing simulation operations;
a system for performing digital twin operations;
a system for performing light transport simulation;
a system for performing collaborative content creation for 3D assets;
a system for performing deep learning operations;
a system implemented using an edge device;
a system implemented using a robot;
a system for performing conversational AI operations;
a system for generating synthetic data;
a system incorporating one or more virtual machines (VMs);
a system implemented at least partially in a data center; or
a system implemented at least partially using cloud computing resources.

12. A system, comprising:
one or more processors to execute operations including:
retrieving, from memory, a plurality of solutions pre-stored in memory for an optimized parallelized search computation corresponding to concurrent modification of the plurality of solutions, each solution of the plurality of solutions corresponding to a unique initial candidate of a plurality of unique initial candidates and representing a plurality of values in a multi-dimensional space;

allocating, to one or more circuits of the one or more processors a first corresponding solution from the plurality of solutions, the first corresponding solution allocated for modification by a first corresponding circuit of the one or more circuits;

allocating, to the one or more circuits of the one or more processors, a second corresponding solution of a second unique initial candidate from the plurality of solutions, the second corresponding solution allocated for modification by a second corresponding circuit of the one or more circuits;

modifying, by the one or more circuits, at least one value of the first corresponding solution or the second corresponding solution of the plurality of solutions allocated to the one or more circuits to determine a plurality of modified solutions different from the plurality of solutions corresponding to the plurality of unique initial candidates retrieved from the memory;

outputting, by the one or more circuits, a selected solution from the plurality of modified solutions, wherein selecting the selected solution comprises:

determining a deviation metric of the plurality of modified solutions; and selecting, as the selected solution, a modified solution of the plurality of modified solutions based on the determined deviation metric; and causing a computation of one or more delivery navigation operations using the selected solution.

13. The system of claim 12, wherein the one or more processors are to:

generate the plurality of solutions using the one or more circuits according to a parallelized configuration.

14. The system of claim 12, wherein the one or more processors are to:

augment, using the one or more circuits, one or more of the plurality of modified solutions to correspond to the multi-dimensional space.

15. The system of claim 12, wherein the one or more processors are to:

modify, using one or more values within a subset of the multi-dimensional space according to a criterion that defines a search of the subset, the at least one value of the plurality of solutions allocated to the one or more circuits.

16. A method, comprising:

retrieving, by a processor from memory, a plurality of solutions pre-stored in memory for an optimized parallelized search computation corresponding to concurrent modification of the plurality of solutions, each solution of the plurality of solutions corresponding to a unique initial candidate of a plurality of unique initial candidates and representing a plurality of values in a multi-dimensional space;

allocating, by the processor to one or more circuits, a first corresponding solution of a first unique initial candidate from the plurality of solutions, the first corresponding solution allocated for modification by a first corresponding circuit of the one or more circuits;

allocating, by the processor to the one or more circuits, a second corresponding solution of a second unique initial candidate from the plurality of solutions, the second corresponding solution allocated for modification by a second corresponding circuit of the one or more circuits;

modifying, by the one or more circuits, at least one value of the first corresponding solution or the second corresponding solution of the plurality of solutions allocated to the one or more circuits to determine a plurality of modified solutions different from the plurality of solutions corresponding to the plurality of unique initial candidates retrieved from the memory;

outputting, by the one or more circuits, a selected solution from the plurality of modified solutions, wherein the selected solution comprises:

determining a deviation metric of plurality of modified solutions, a selected solution; and selecting, as the selected solution, a modified solution of the plurality of modified solutions based on the determined deviation metric; and causing, by the processor, a computation of one or more delivery navigation operations using the selected solution.

17. The method of claim 16, further comprising:

generating, by the processor using the one or more circuits according to a parallelized configuration, the plurality of solutions; and modifying, by the processor using one or more values within a subset of the multi-dimensional space according to a criterion that defines a search of the subset, the at least one value of one or more solutions of the plurality of solutions allocated to the one or more circuits.

18. The method of claim 17, wherein the criterion corresponds to at least one of:

a threshold distance from one or more of the plurality of solutions and at least one heuristic to search the multi-dimensional space outside of the threshold distance;

a threshold distance from one or more of the plurality of solutions within which to search the multi-dimensional space; or a threshold distance from one or more of the plurality of solutions within which to search the multi-dimensional space and a criterion to randomly search the multi-dimensional space.

19. The method of claim 16, further comprising:

determining, by the processor according to a threshold relative to one or more of the plurality of solutions, that one or more criteria satisfy the threshold to indicate a deviation from the deviation metric; and outputting, according to the determination that the one or more criteria satisfy the threshold to indicate the deviation, the selected solution.

20. The method of claim 16, further comprising:

excluding, by the processor according to a determination that one or more criteria do not indicate that the deviation metric meets a threshold, the selected solution.

* * * * *